United States Patent
Yang et al.

(10) Patent No.: US 9,744,473 B2
(45) Date of Patent: Aug. 29, 2017

(54) DENSELY STACKABLE BUILDING BLOCK SYSTEM

(71) Applicant: Mei-Tsu Lin, New Taipei (TW)

(72) Inventors: Mu Chien Yang, New Taipei (TW); Yi Chien Yang, New Taipei (TW)

(73) Assignee: Mei-Tsu Lin (TW)

( * ) Notice: Subject to any disclaimer, the term of this patent is extended or adjusted under 35 U.S.C. 154(b) by 0 days.

(21) Appl. No.: 15/215,737

(22) Filed: Jul. 21, 2016

(65) Prior Publication Data

US 2017/0072331 A1  Mar. 16, 2017

Related U.S. Application Data

(63) Continuation-in-part of application No. 14/850,919, filed on Sep. 10, 2015, now abandoned.

(51) Int. Cl.

| | | |
|---|---|---|
| A63H 33/04 | (2006.01) | |
| A63F 3/00 | (2006.01) | |
| A63H 33/06 | (2006.01) | |
| G09B 1/02 | (2006.01) | |

(52) U.S. Cl.
CPC ............... A63H 33/06 (2013.01); G09B 1/02 (2013.01)

(58) Field of Classification Search
USPC ......... 446/85, 104, 117, 118, 120, 121, 124, 446/125, 127, 128
See application file for complete search history.

(56) References Cited

U.S. PATENT DOCUMENTS

| | | | | |
|---|---|---|---|---|
| 4,173,833 A | * | 11/1979 | Rosenblatt | G09B 1/06 434/236 |
| 4,988,103 A | * | 1/1991 | Cheng | A63F 9/12 273/157 R |
| 5,988,640 A | * | 11/1999 | Wheeler | A63F 3/00574 273/153 P |
| 6,220,919 B1 | * | 4/2001 | Cheng | A63F 9/12 273/153 P |
| 6,637,745 B1 | * | 10/2003 | Vardanyan | A63F 9/12 273/153 P |
| 8,387,989 B2 | * | 3/2013 | Baum | A63F 9/0073 273/156 |
| 8,480,449 B2 | * | 7/2013 | Cheng | A63F 9/1288 273/153 R |

* cited by examiner

*Primary Examiner* — Nini Legesse

(57) ABSTRACT

A densely stackable building block system comprises a stand and exactly five three-dimensional blocks. Each block is composed of four identical spheres. Configurations of the five blocks are different from each other. The five blocks are combinable with each other to form a detachable stacked arrangement shaped as a regular triangular pyramid. The stand is formed with ten concaves for accommodating a portion of a bottom layer of the stacked arrangement. The five blocks are stackable on the stand to form the stacked arrangement by at least four different sequences.

2 Claims, 36 Drawing Sheets

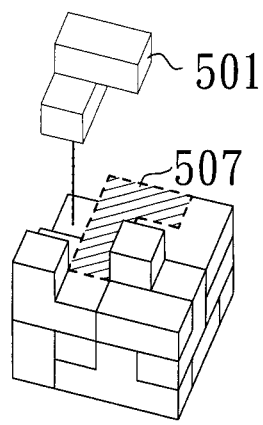
( 6 )
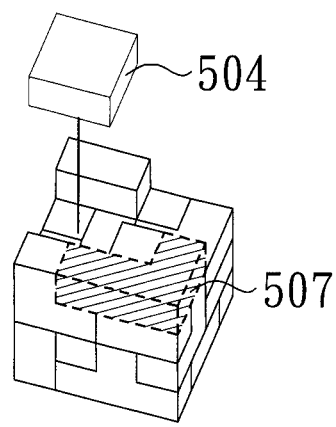
( 8 )
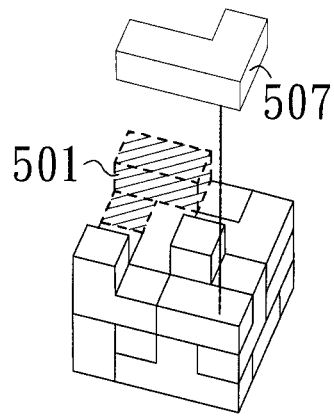
( 7 )
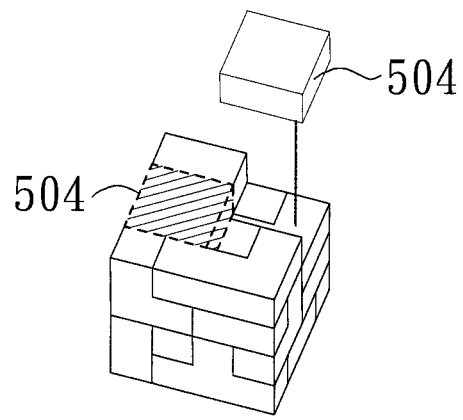
( 9 )
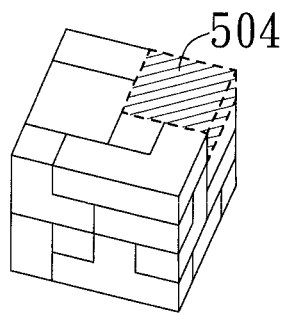
( 10 )
FIG. 5B

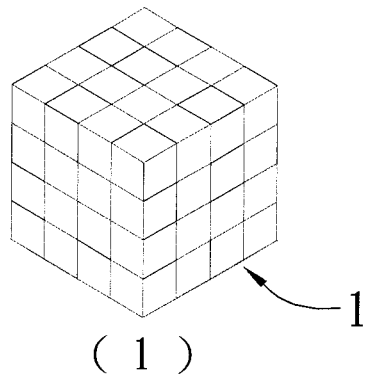
( 1 )
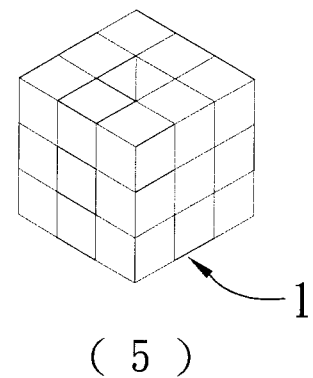
( 5 )
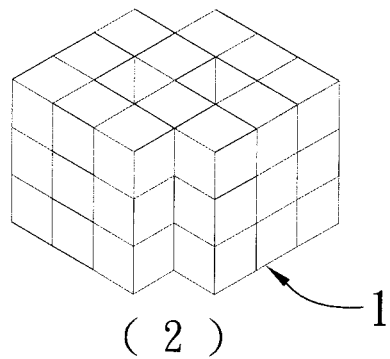
( 2 )
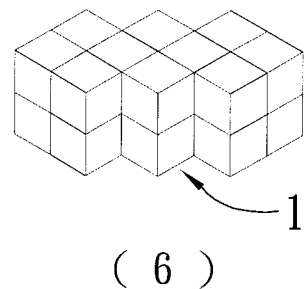
( 6 )
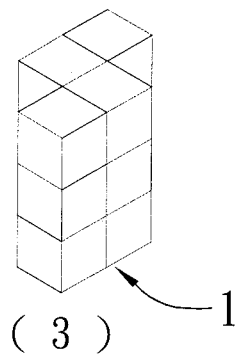
( 3 )
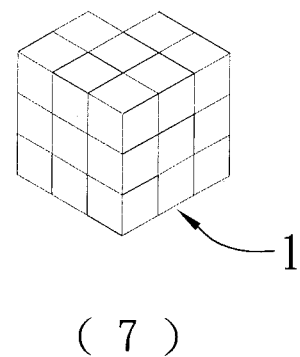
( 7 )
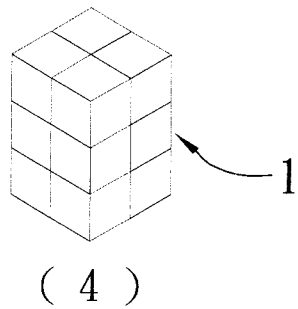
( 4 )
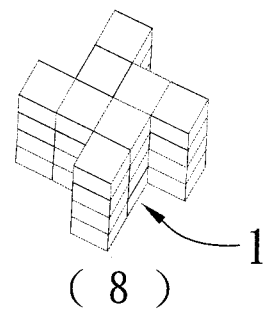
( 8 )
FIG. 6

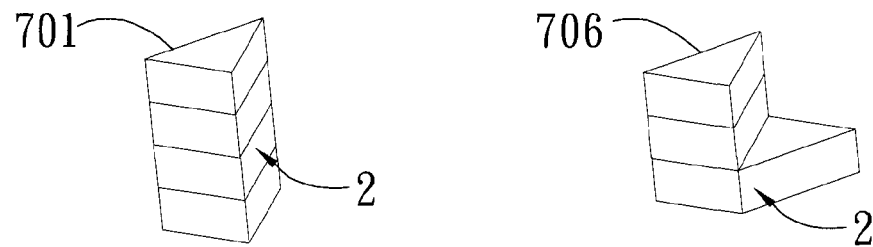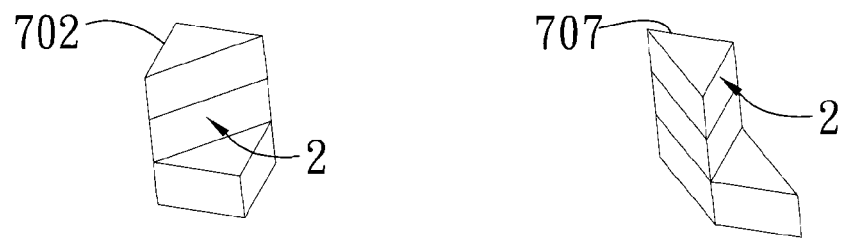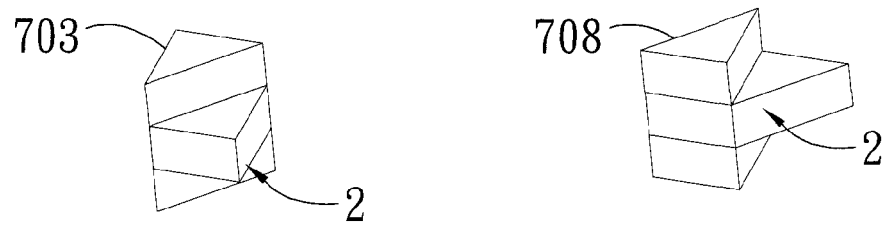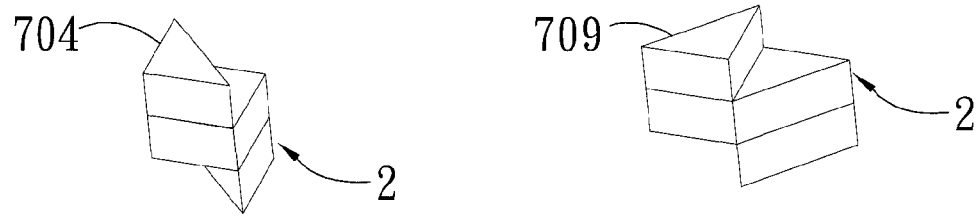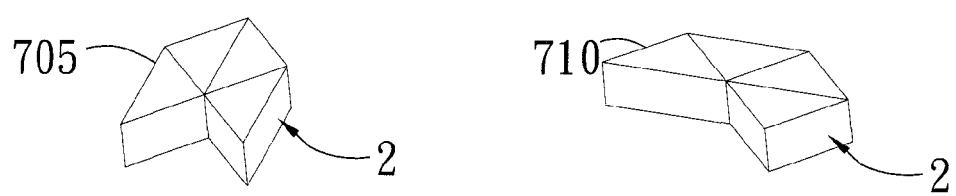
FIG. 8A

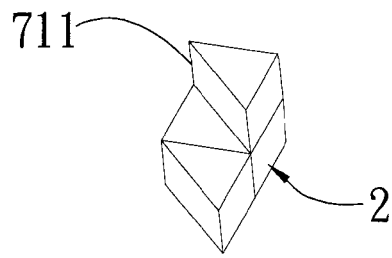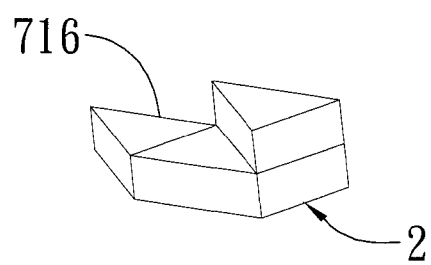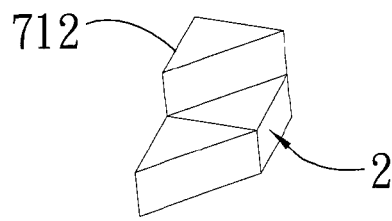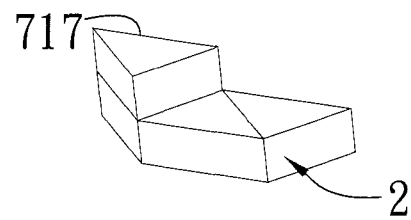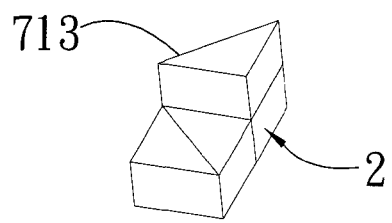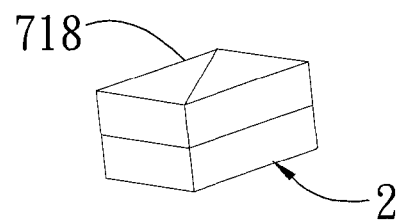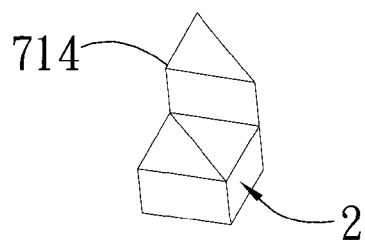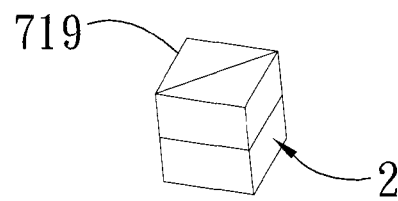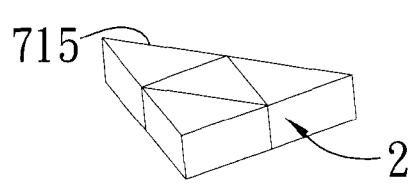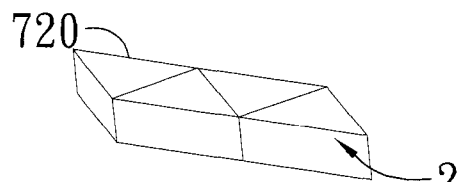
FIG. 8B

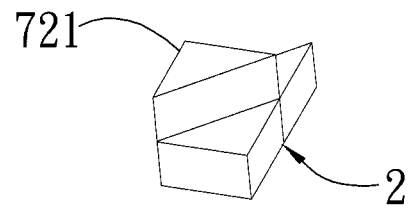
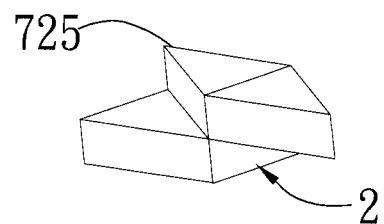
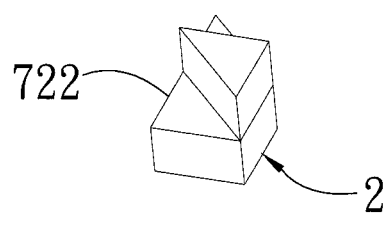
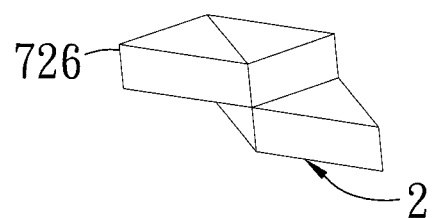
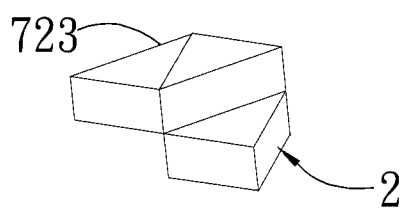
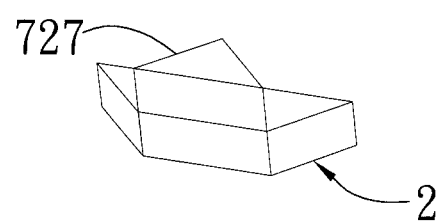
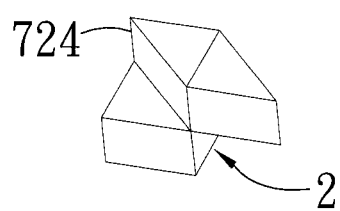
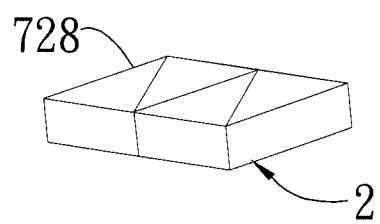
FIG. 8C

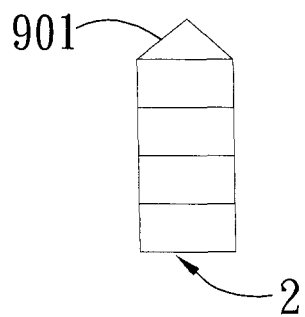
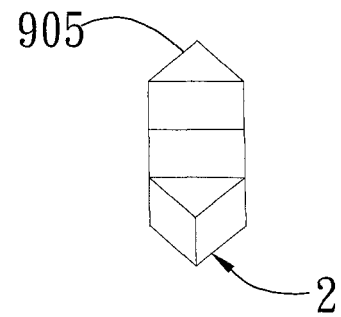
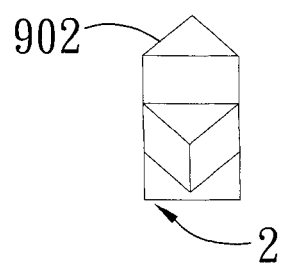
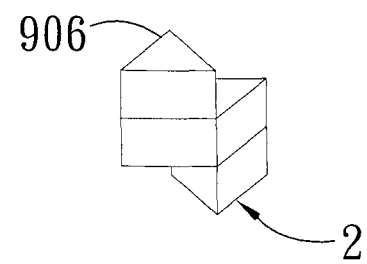
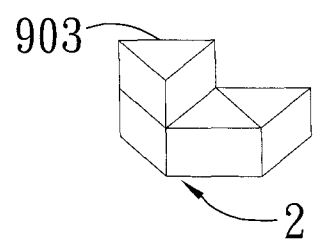
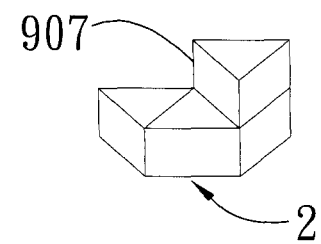
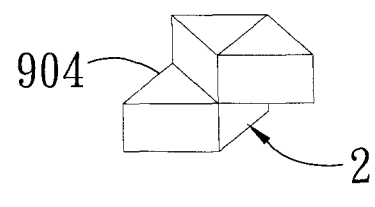
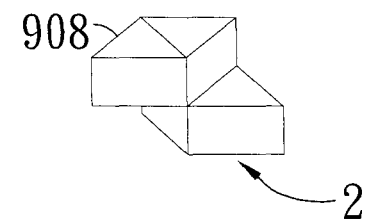
FIG. 10A

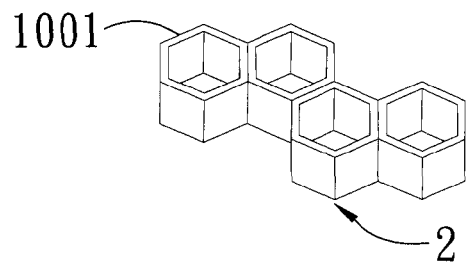
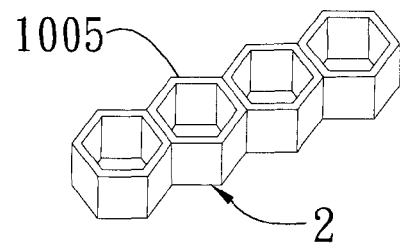
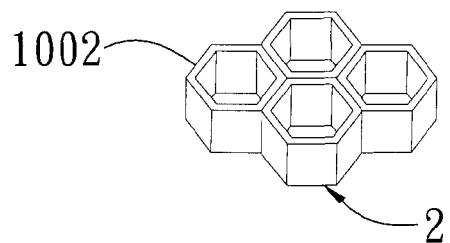
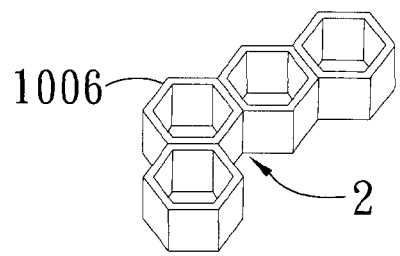
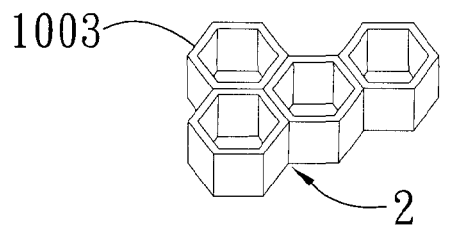
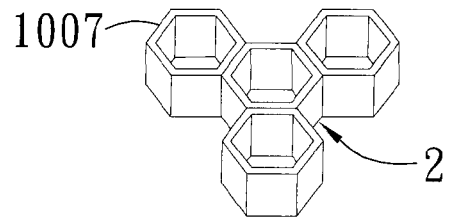
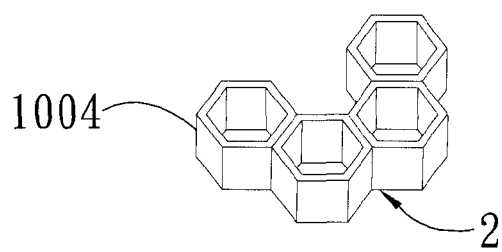
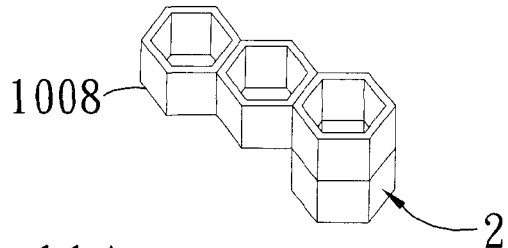
FIG. 11A

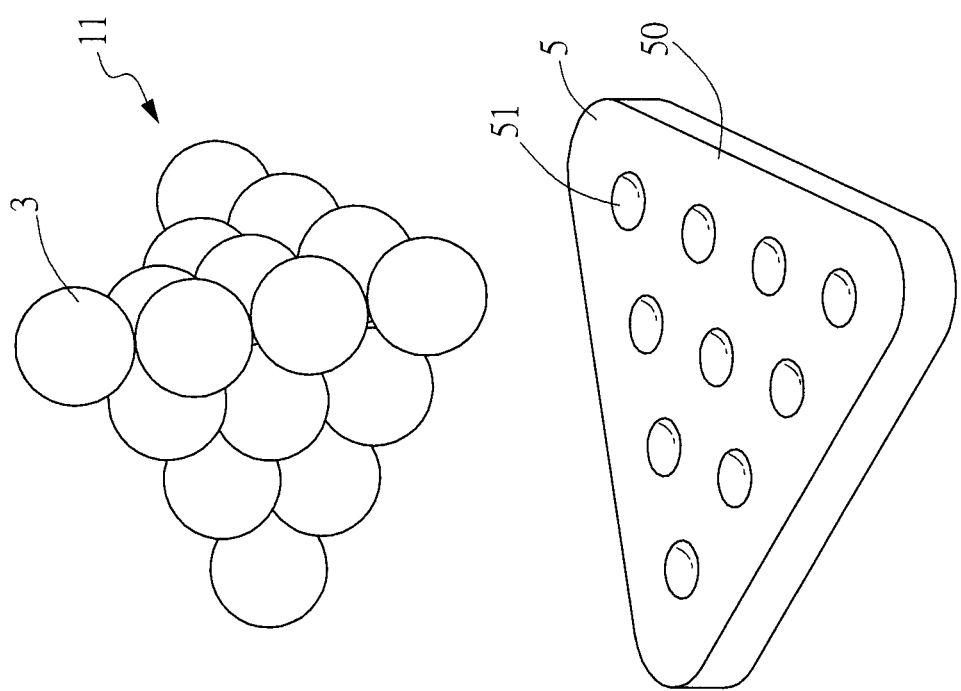

DENSELY STACKABLE BUILDING BLOCK SYSTEM

RELATED CASES

This is a continuation-in-part of co-pending Ser. No. 14/850,919, filed on Sep. 10, 2015, whose disclosures are incorporated by this reference as though fully set forth herein.

(a) TECHNICAL FIELD OF THE INVENTION

The present invention relates generally to the field of puzzle based teaching aids, in which four unit cells of the same kind are connected through connection facets having identical surface areas to form each of a plurality of different and non-repeated shaped blocks for training a user for logic thinking in stacking and assembling the shaped blocks to form a predetermined target structure through one of a number of assembly ways.

(b) DESCRIPTION OF THE PRIOR ART

During the growth of a young child, to improve his or her cognitive capability, logic thinking capability, concept forming capability, and creativity, parents often uses various intelligence-helping teaching aids as assisting tools. The most commonly known and used intelligence-helping teaching aids are building blocks. Building block products that are currently available in the market can be classified as jointing connection, magnetic connection, and stacking. For products of the same types, building blocks of stackable structures are the mainstream products in the market. This is because these structures of the blocks are simple and no complicated components and rules are involved and are quite helpful in training all sorts of capabilities mentioned above.

Commercially-available products, having been properly improved and modified, provide building block kit that allows for stacking to make a specific configuration and is sold accompanying with a solution booklet. Such a special configuration of the building block kit can always be achieved by having the blocks stacked in exactly the same way provided in the solution booklet. However, a careful review and study of the solution provided in the solution booklet indicates that this is simply designed through compromising between the shapes of the blocks and the solution so achievable.

An example is disclosed in U.S. Pat. No. 3,945,645A. The contents of this document provide eight assembly pieces that are each made up of four spheres in FIGS. 3-10a thereof and an assembly piece made of three spheres in FIGS. 2 and 2a. There are in total 35 spheres needed for formation of a pyramid on a retainer frame. However, those eight assembly pieces count for only 32 spheres in total, so that the remaining three spheres are provided by the sole three-sphere assembly piece in order to meet the requirement for 35 spheres. Manifestly, there is no coherent design principle through all the assembly pieces and the design is an insufficiency-filling arrangement simply for satisfying the desired number of spheres. U.S. Pat. No. 3,974,849A is another example, which provides 18 embodiments, each of which comprises a set that is involved with a basic shape and includes a different number of blocks, which are combined by being inlaid in a puzzle board, to provide a plan configuration. The numbers of blocks used to make the plan configuration are generally random, making it not possible to figure out any rule or model of assembly. Apparently, all the plan configurations are designed in such a way that the plan configurations are selected and modified simply for accommodating the solutions. U.S. Pat. No. 5,301,953A discloses a basic geometric shape, which is the minimum size and is arranged with a whole number multiple thereof to form a plurality of playing pieces. A game is played by a player throwing a dice to determine removal of a playing piece from a playing board of an opponent or to place a playing piece of his or her own in the playing board. The game is played on a planar surface with variables including multiples of the constitutions of the configurations of the playing pieces and the number of the dice that is thrown. The constitution of the playing piece and the rule of the game are quite complicated and varying. Although specific rules are involved, it is adequate as a planar game, but may not be practiced properly as a three-dimensional game. U.S. Pat. No. 8,480,449B2 simply discloses building a pyramid with block units. The bottommost layer is a game tray. Toy blocks are provided, including eight toy blocks that are each formed of five block units and four toy blocks that are each formed of four block units. In each embodiment provided, connection or jointing is achieved under specific angular constraints. These toy blocks are generally constructed with different numbers of block units.

In view of the above discussion, it is clear that all these known devices show no coherence in constructing the basic or elementary units and the designs are simply provided to accommodate the solutions provided by adjusting the numbers of basic units involved so that the basic units involved may vary from a single one to plural ones. This imposes limitations to the final configuration of the solution and also set undesired constraint to the development of the young children. It is thus desired to provide improvements over the shortcomings of the known building blocks.

SUMMARY OF THE INVENTION

In view of the above, the present invention provides a densely stackable building block system, which comprises a stand and exactly five three-dimensional blocks. Each block is composed of exactly four identical spheres. Configurations of the five blocks are different from each other. The five blocks are combinable with each other to form a detachable stacked arrangement which is in a shape of a regular triangular pyramid (i.e., a regular tetrahedron) having exactly four identical triangular-shaped surfaces. The stand is formed with ten concaves for accommodating a portion of a bottom layer of the stacked arrangement. The five blocks are stackable on the stand to form the stacked arrangement shaped as the regular triangular pyramid by at least four different sequences.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 5B shows a stacking process of the target structure according to the present invention.

FIG. 6 illustrates various examples of target structures according to the present invention.

FIG. 8A illustrates parallel-right-triangle-based shaped blocks respectively designated as C1-C10 according to the present invention.

FIG. 8B illustrates parallel-right-triangle-based shaped blocks respectively designated as C11-C20 according to the present invention.

FIG. 8C illustrates parallel-right-triangle-based shaped blocks respectively designated as C21-C28 according to the present invention.

FIG. 10A illustrates regular-triangle-based shaped blocks respectively designated as E1-E8 according to the present invention.

FIG. 11A illustrates hexagon-based shaped blocks respectively designated as F1-F8 according to the present invention.

FIG. 13 illustrates an embodiment of the densely stackable building block system comprising a stand for supporting a regular-triangular-pyramid shaped stacked arrangement in accordance with the present invention.

DETAILED DESCRIPTION OF THE PREFERRED EMBODIMENTS

Figure 1:
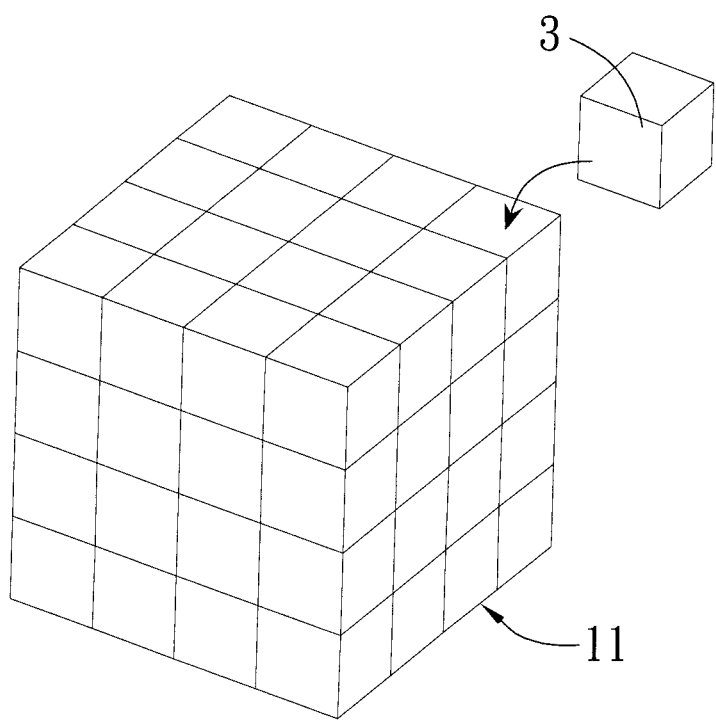
FIG. 1 is a perspective view showing a cubic target arrangement according to the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention provides a densely stackable building block system and a method, in which a plurality of predefined target structures is provided, each of which is constructed by stacking, with at least one way, shaped blocks selected among a plurality of different and non-repeated shaped blocks. The shaped blocks are each formed of four unit cells of the same kind connected through connection facets thereof having identical surface areas.

The building block system of the present invention provides the following advantages:

(1) Equal quantity: each of the different and non-repeated shaped blocks is formed of four unit cells having the same shape and size.

(2) Coherence: each of the shaped blocks has a different and non-repeated configuration, but the unit cells are connected through connection facets having identical surface areas in a vertical direction, a horizontal direction, or a combination of vertical and horizontal directions.

(3) Completeness: the shaped blocks that are each formed of a four-connected sub-assembly extracted from the stacked arrangement can surely be fit in the target structure.

As such, selecting shaped blocks from a plurality of non-repeated shaped blocks to correspond to and consist with a preset target structure helps train logic thinking of a user to assemble and form, through at least one way of assembly, the preset target structure. This differs the present invention from the prior art put-together puzzles or building blocks and allows for the use of unit cells of various shapes.

A detailed description of a preferred embodiment according to the present invention will be given, in connection with the attached drawings, in order to provide a better understanding of the present invention. Referring to FIGS. 1-12B, the present invention provides a densely stackable building block system and a method thereof. The building block system generally comprises a stacked arrangement (11) that is formed of unit cells (3) of same kind. The term "same kind" as used herein refers to the unit cells having the same shape and size. A connection between one unit cell (3) and another unit cell (3) is achieved with connection facets (4) thereof that are of identical surface areas. The stacking of the connection facets (4) adopts the one having largest density. A plurality of shaped blocks (2) is constituted by different and non-repeated configurations, each of which is formed of four unit cells (3), extracted from the stacked arrangement (11), wherein the connection between the unit cells (3) is horizontal, vertical, or both horizontal and vertical. A plurality of predefined target structures (1) are each constructed by stacking shaped blocks (2) that a user selects among the plurality of shaped blocks (2) through at least one assembly manner.

In detail, a method of building blocks for densely stacking is provided as follows: (a) a plurality of unit cell (3) of same kind being provided, connection facets (4) of and jointing the unit cells (3) being stacked in a manner of identical surface areas so as to achieve a maximum density and thus constructing a stable stacked arrangement (11), wherein all the unit cell (3) show coherence; (b) making a set by selecting unit cells (3) having the number of four, extracting a plurality of shaped blocks (2) from the stacked arrangement (11) in such a way that the shaped blocks (2) shows a characteristic of identical quantity; (c) training a user to think out at least one assembly manners to construct a target structure (1) through extracting a number of different and non-repeated shaped blocks (2), the unit cells (3) being applicable to configurations of different kind so as to make the target structure (1) better in completeness for accommodating various sorts of shaped blocks (2).

In a first embodiment of the present invention, reference is made to the stacked arrangement (11) shown in FIG. 1, which is a cube composed of 4×4×4 unit cells (3), in total 64 unit cells (3), formed by the previously described maximum density stacking manner. An illustration with reference to the cube will be given. The connection area of each of the unit cell (3) is identical and each cube has the same shape and size. Based on this, stacking is conducted to make a gap between the unit cells (2) minimum and this is the stacking manner that provides the maximum density.

Figure 2:
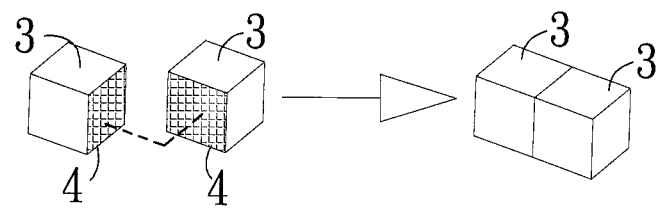
FIG. 2 is s a schematic view illustrating connection facets connected in a manner of maximum density according to the present invention.
Figure 2A:
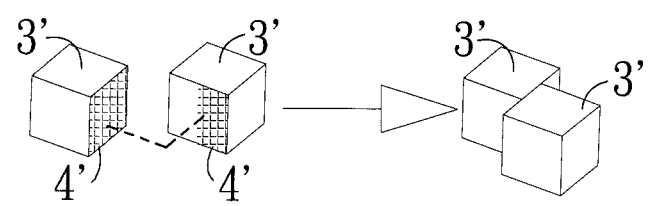
FIG. 2A is a schematic view illustrating connection facets connected in a manner of not maximum density according to the present invention.

Referring to FIG. 2, when one unit cell (3) is connected to another unit cell (3), based on the previous constraint conditions of identical shape and identical size and complete contact achieved between the connection facets (4), FIG. 2 illustrates an example that is constructed to meet the conditions. As shown in FIG. 2A, when one unit cell (3') is connected to one unit cell (3'), it can be seen that the connection facet (4) and the connection facet (4') are not in complete contact with each other so that a stack so made is not of the maximum density; and further, after a number of unit cells (3') are stacked, it is not possible to obtain an outside configuration that is stable and aesthetic as that illustrated in FIG. 1.

Figure 3:
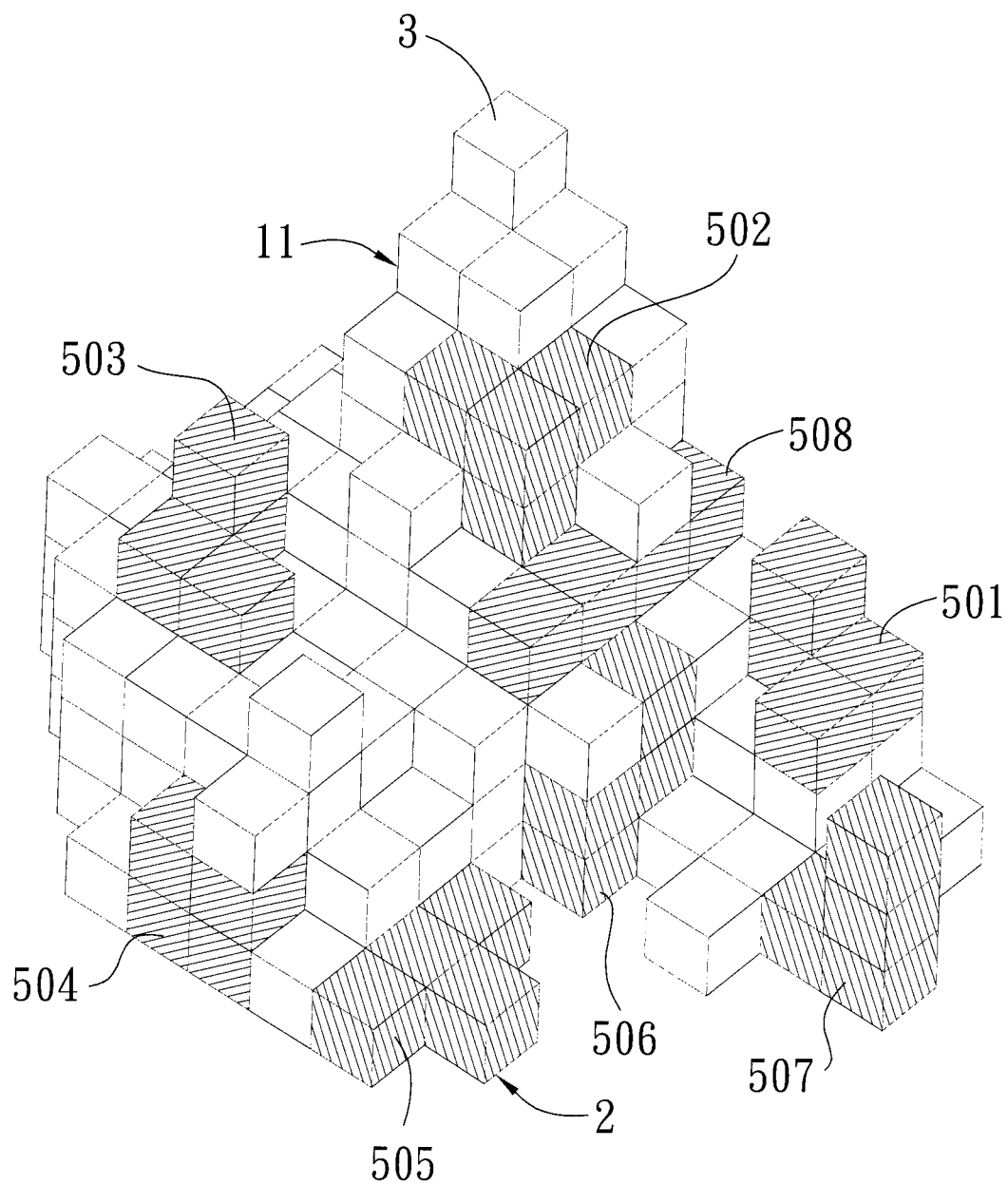
FIG. 3 is a schematic view illustrating a stacked arrangement of cubes according to the present invention.
Figure 3A:
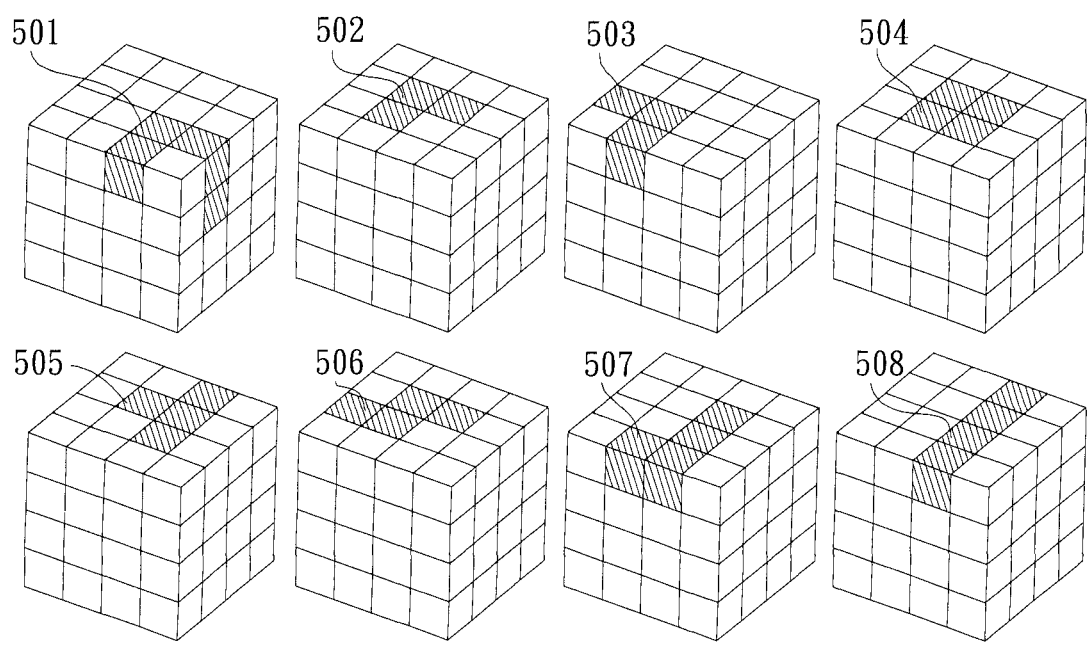
FIG. 3A is a schematic view illustrating cube-based shaped blocks according to the present invention.
Figure 4:
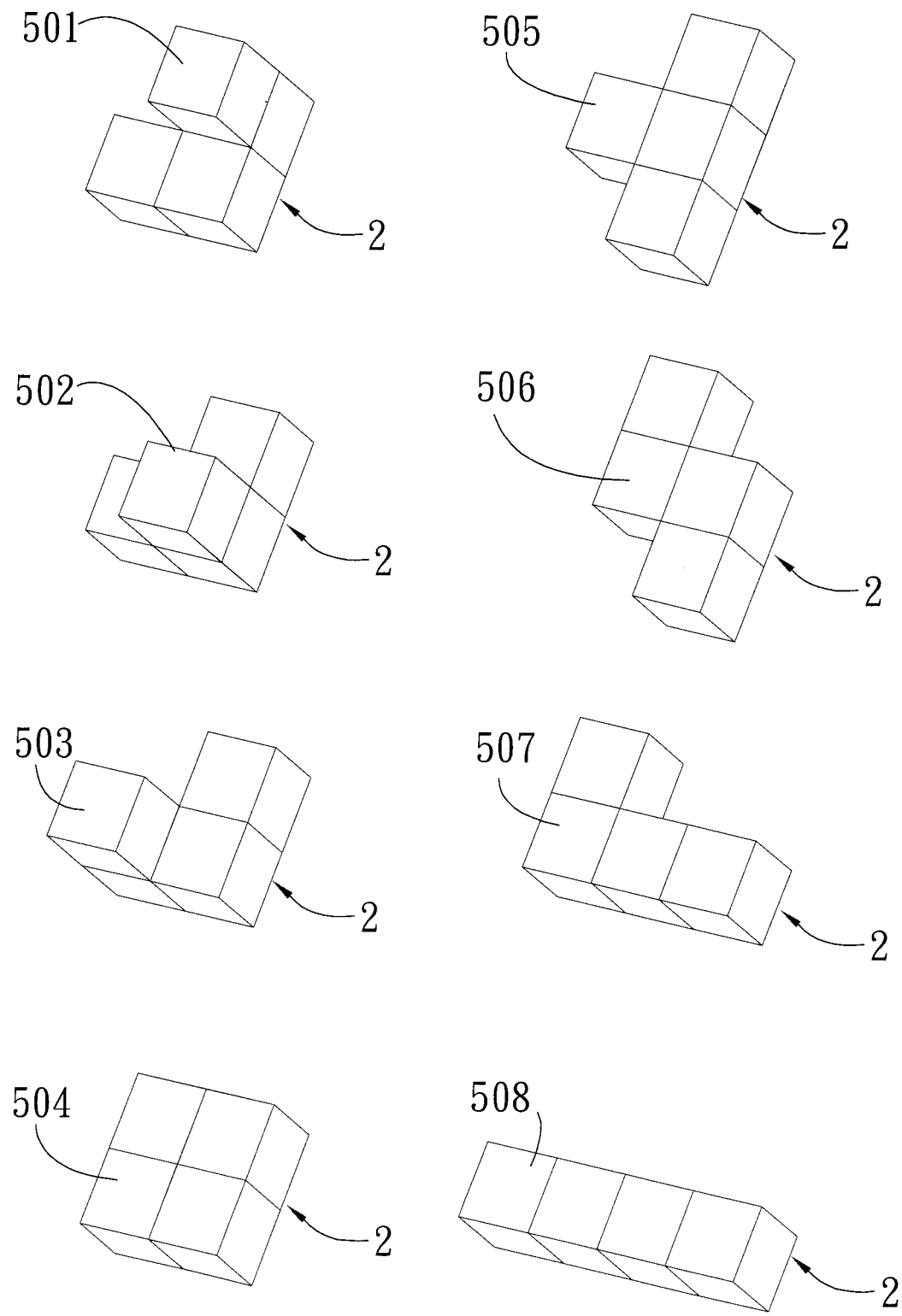
FIG. 4 shows perspective views of cube-based shaped blocks A1-A8 according to the present invention.
Figure 5:
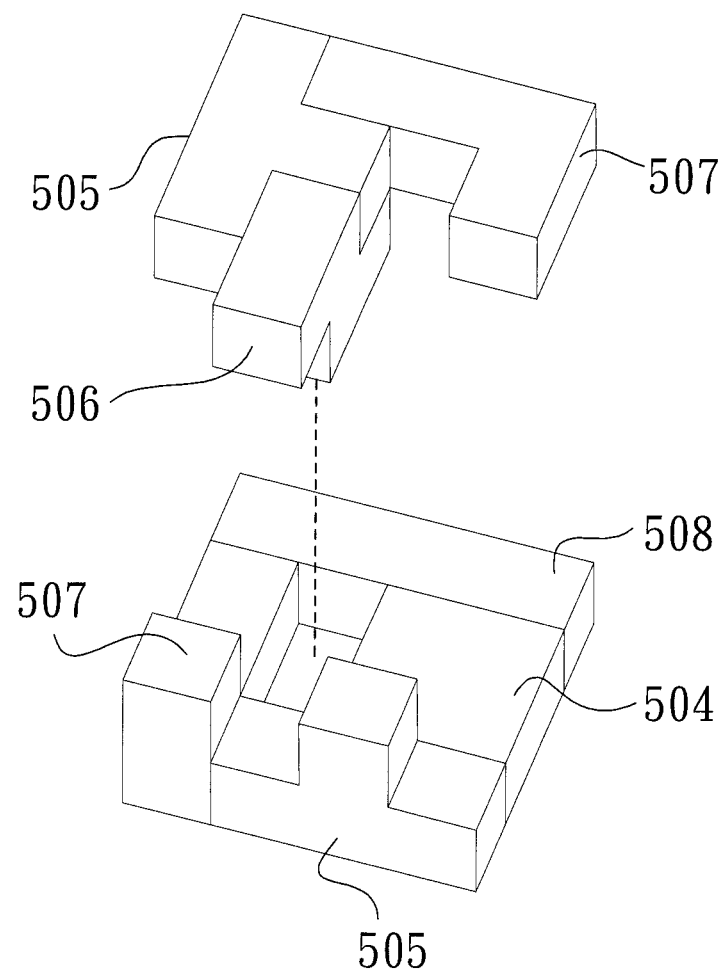
FIG. 5 is a schematic view illustrating stacking of the target structure according to the present invention.
Figure 5A:
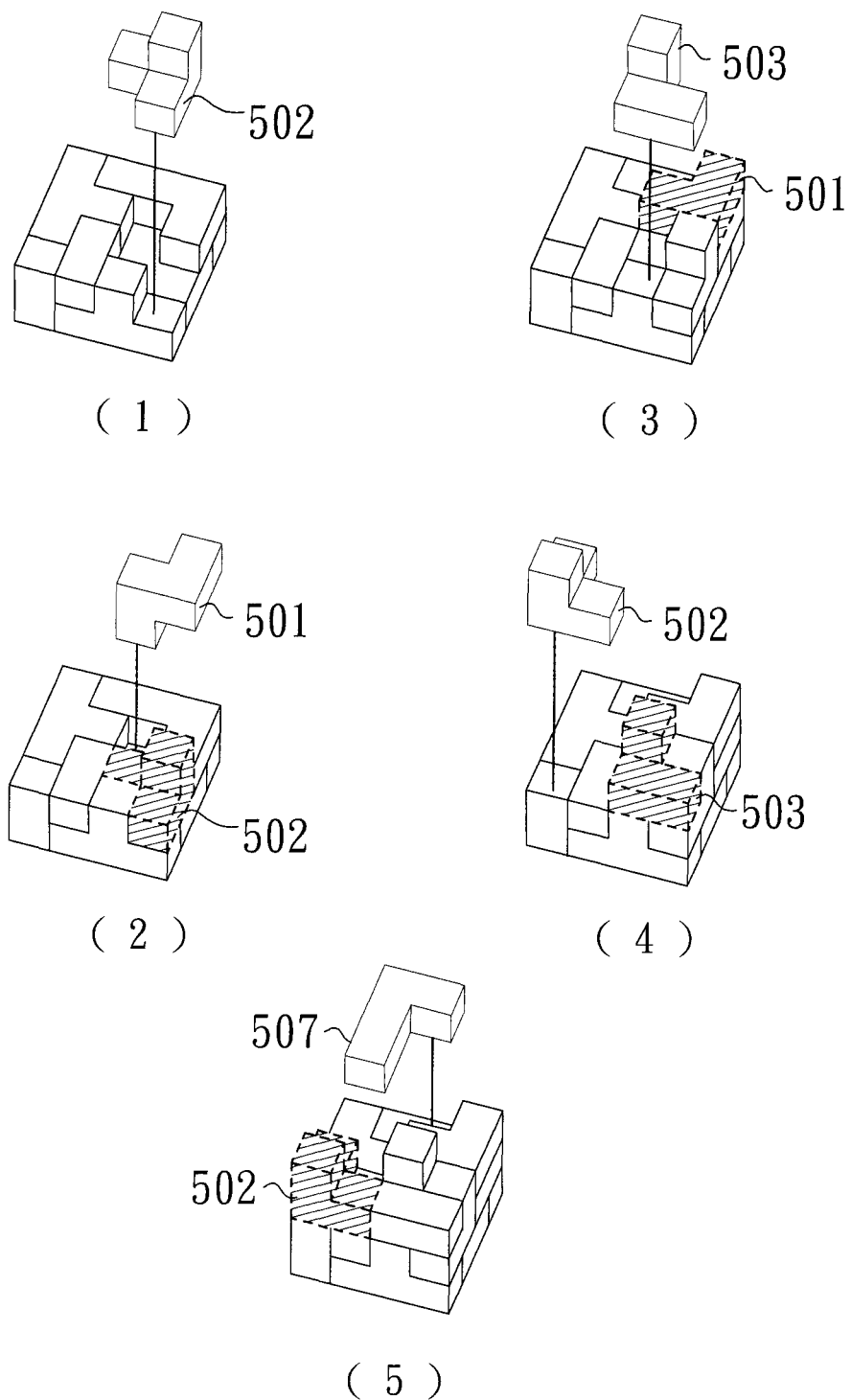
FIG. 5A shows a stacking process of the target structure according to the present invention.

Referring to FIGS. 3-6, FIG. 3 illustrates a stacked arrangement (11) formed by stacking cubic bodies. The stacked arrangement (11) is constructed by taking the maximum density stacking manner. A fixed number of unit cells (3) are extracted from the stacked arrangement (11) to form each of a plurality of shaped blocks (2). In the instant embodiment, the fixed number is four and the shaped blocks (2) so formed are exemplified in FIGS. 3A-4 and will be referred to as cube-based shaped blocks A1-A8 (respectively designated at 501-508), of which the number is eight in total. If a larger number of unit cells (3) are retracted, then the stacked arrangement (11) must be expanded in respect of the quantity for assembly. As shown in FIG. 5, a bottommost layer is shown, composed of the cube-based shaped blocks A4 (504), A5 (505), A7 (507), and A8 (508), but lacking of two unit cells (3) and thus, the cube-based shaped blocks A5 (505), A6 (506), and A7 (507) are used and stacked on the bottommost layer. Further referring to FIG. 5A, in part (1) of FIG. 5A, the cube-based shaped block A2 (502) is stacked; in part (2) of FIG. 5A, the cube-based shaped block A1 (501) is stacked; in part (3) of FIG. 5A, the cube-based shaped block A3 (503) is stacked; in part (4) of FIG. 5A, the cube-based shaped block A2 (502) is stacked; in part (5) of FIG. 5A, the cube-based shaped block A7 (507) is stacked; further referring to FIG. 5B, in part (6) of FIG. 5B, the cube-based shaped block A1 (501) is stacked; in part (7) of FIG. 5B, the cube-based shaped block A7 (507) is stacked; in part (8) of FIG. 5B, the cube-based shaped block A4 (504) is stacked; and in part (0) of FIG. 5B, the cube-based shaped block A4 (504) is stacked, and this completely the stacking process and a structure as shown in part (10) of FIG. 5B is formed.

In the instant embodiment, the eight cube-based shaped blocks A1-A8 (501-508) have all been used; this eliminates the prior art that allows for stacking a specific structure due to be constrained by the solution provided. In this invention, the specific stacking solution is for example 4×4×4 (=64) unit cells (3) being involved and thus, the present invention requires stacking of 16 sub-assemblies of four-connected unit cells (3), while in the prior art, multiple-connected sub-assemblies involving 2, 3, 4, 5, 6 . . . units are used, which leads to pre-selection of non-four-connected blocks for use in combination with four-connected blocks to reach the desired solution.

Referring to FIG. 6, eight examples of target structure (1), which are of different difficulty level, are provided for corresponding to the eight cube-based shaped blocks A1-A8 (501-508) discussed above, with which the logic thinking of a user may be trained to construct each of the target structures (1) in at least one way. Considering all the target structures (1) shown in FIG. 6, except the one labeled (1) that can be formed with the cube-based shaped block A8 (508), the remaining structures respectively labeled (2)-(8) may not be constructed with it, because these target structures (1) do not involve the shaped block (2). In summary, in the present invention, to construct the target structure (1), all the shaped blocks (2) are four-connected bodies and this is different from the random arrangement of the prior art for compliance with the solution or the desired shaped. Further, each target structure (1) can be constructed with at least one way so that the logic thinking capability of the user may be improved. Thus, the building block system that adopts the maximum density stacking shows the characteristics of coherence, equal quantity, completeness, and versatile ways of connection.

Figure 7:
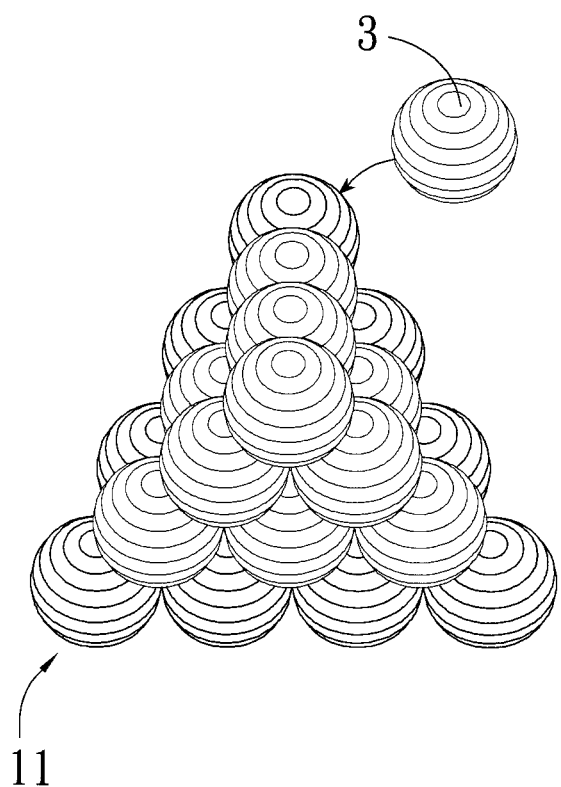
FIG. 7 illustrates a stacked arrangement formed of spheres according to the present invention.
Figure 7A:
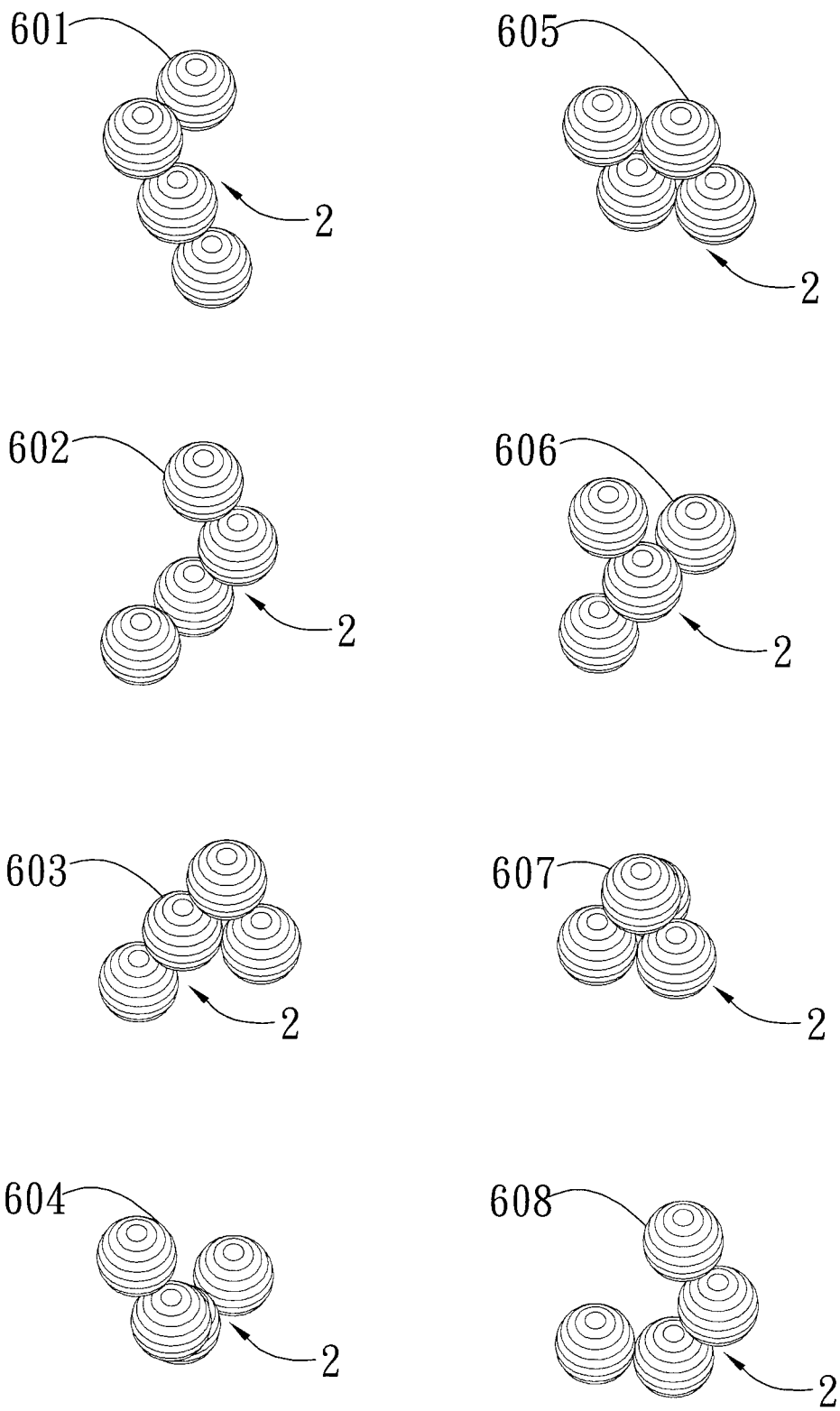
FIG. 7A illustrates sphere-based shaped blocks respectively designated as B1-B8 according to the present invention.
Figure 7B:
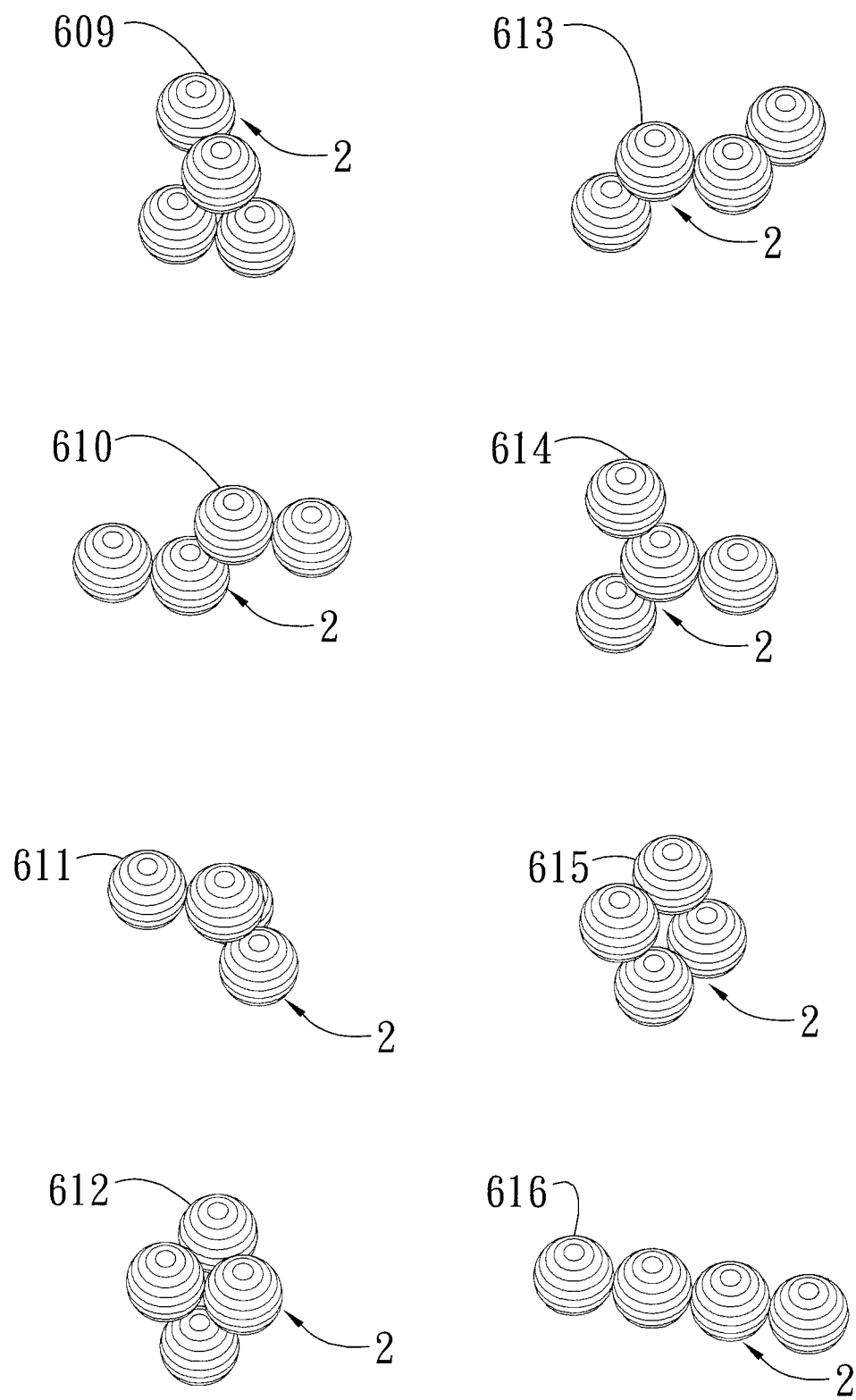
FIG. 7B illustrates sphere-based shaped blocks respectively designated as B9-B16 according to the present invention.
Figure 7C:
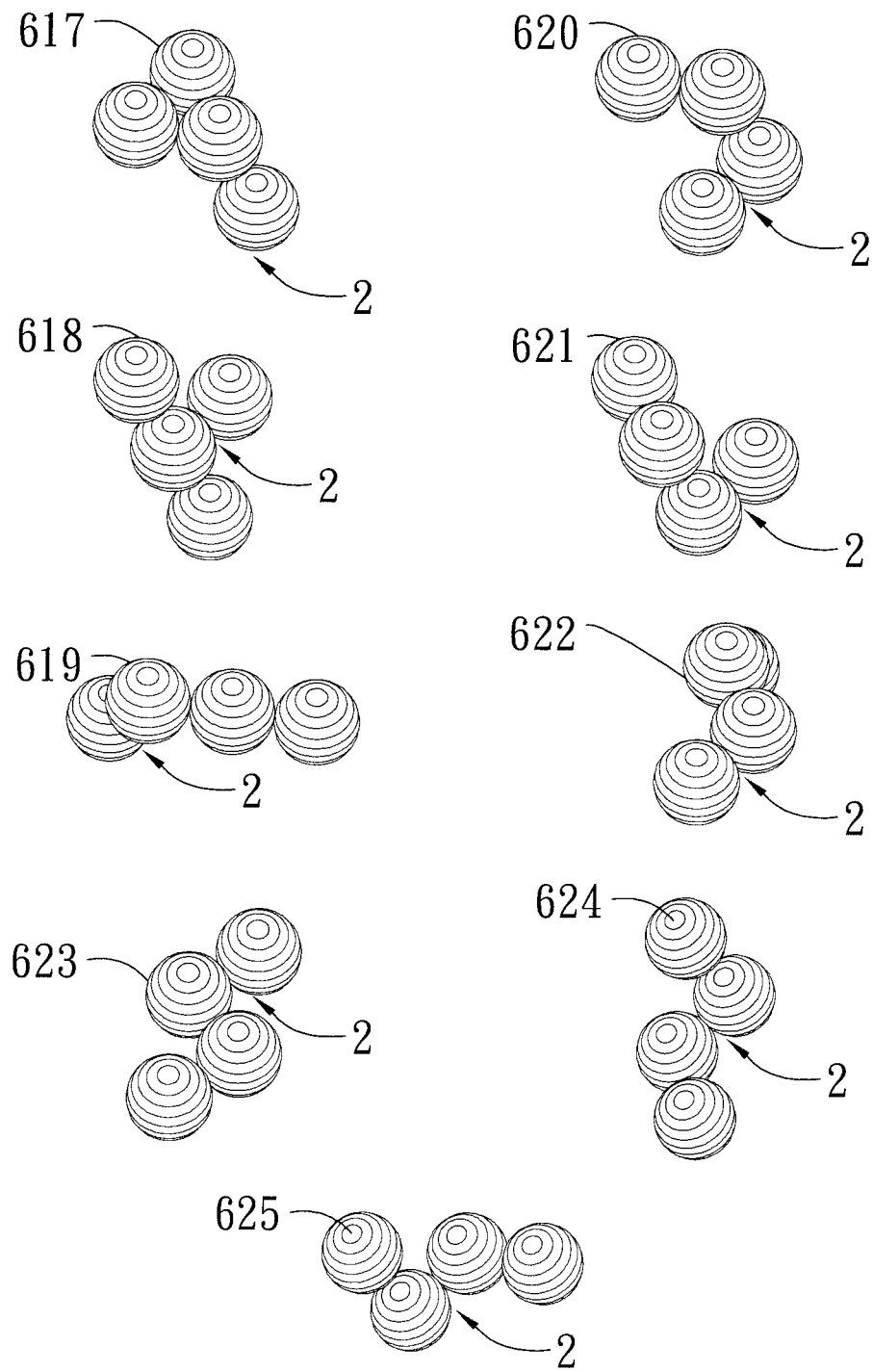
FIG. 7C illustrates sphere-based shaped blocks respectively designated as B17-B25 according to the present invention.

In a second embodiment of the present invention, as shown in FIG. 7, a stacked arrangement (11) in the form of a regular triangular pyramid is provided, comprising four layers from the bottom to the top, respectively comprising 10, 6, 3, and 1 spherical unit cells (3), in total 20 spherical unit cells (3), which are stacked by taking a stacking manner that provides the maximum density. Spheres of a number of four are extracted from the regular triangular pyramid, as shown in FIGS. 7A-7C, and totally, 25 different sphere-based shaped blocks B1-B25 (respectively designated at 601-625) are obtained.

Figure 8:
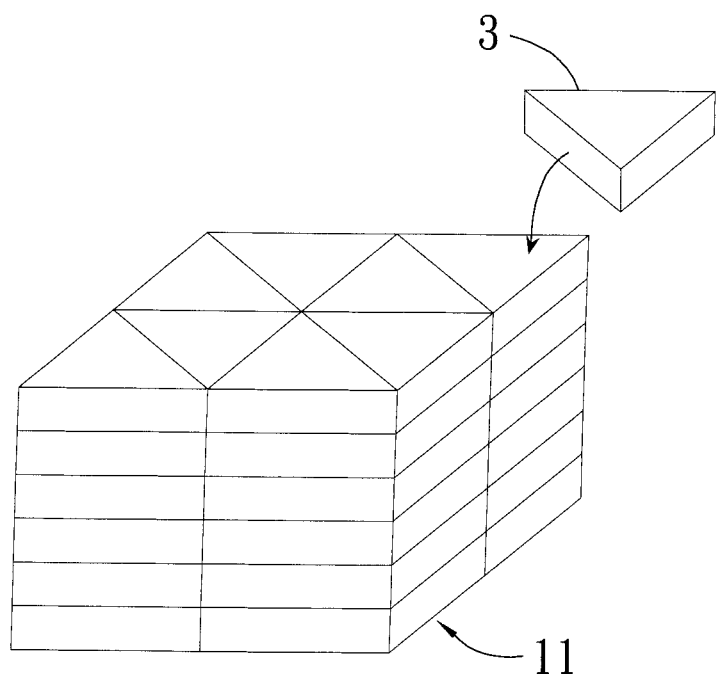
FIG. 8 illustrates a stacked arrangement formed of parallel right triangles according to the present invention.

In a third embodiment of the present invention, as shown in FIG. 8, a stacked arrangement (11) in the form of a parallelepiped is provided, comprising six layers from the bottom to the top, each including 8 unit cell (3), so that there are totally 48 parallel-right-triangle-based unit cells (3). The stacked arrangement (11) is constructed by stacking in a manner of maximum density. As shown in FIGS. 8A-8C, totally 28 different parallel-right-triangle-based shaped blocks C1-C28 (respectively designated at 701-728) are obtained.

Figure 9:
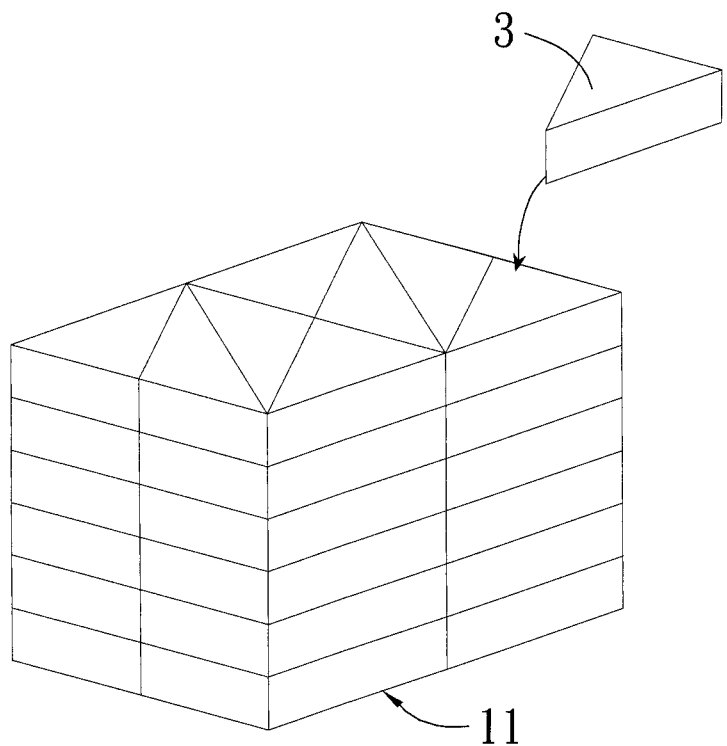
FIG. 9 illustrates a stacked arrangement formed of symmetric right triangles according to the present invention.
Figure 9A:
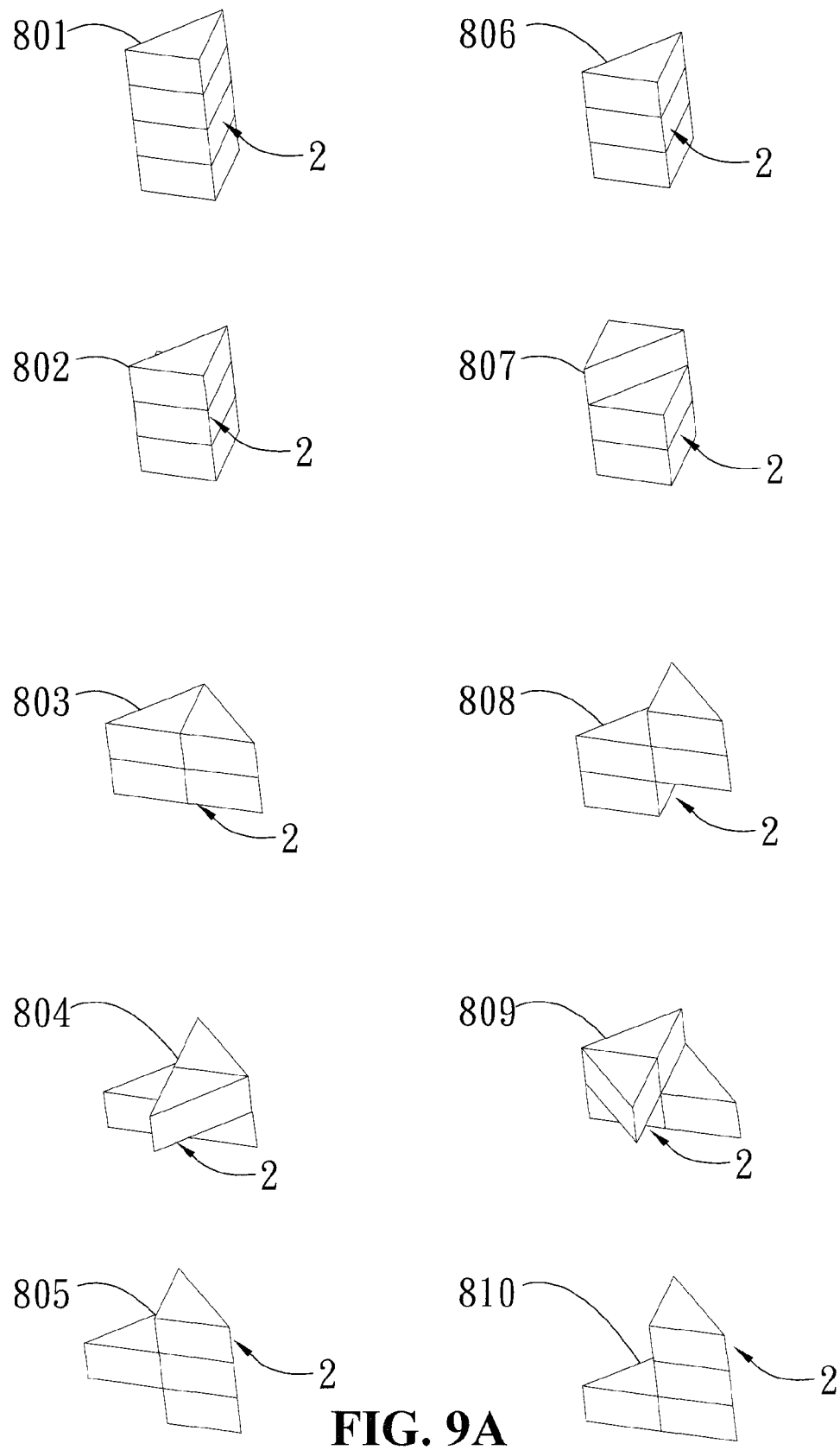
FIG. 9A illustrates symmetric-right-triangle-based shaped blocks respectively designated as D1-D10 according to the present invention.
Figure 9B:
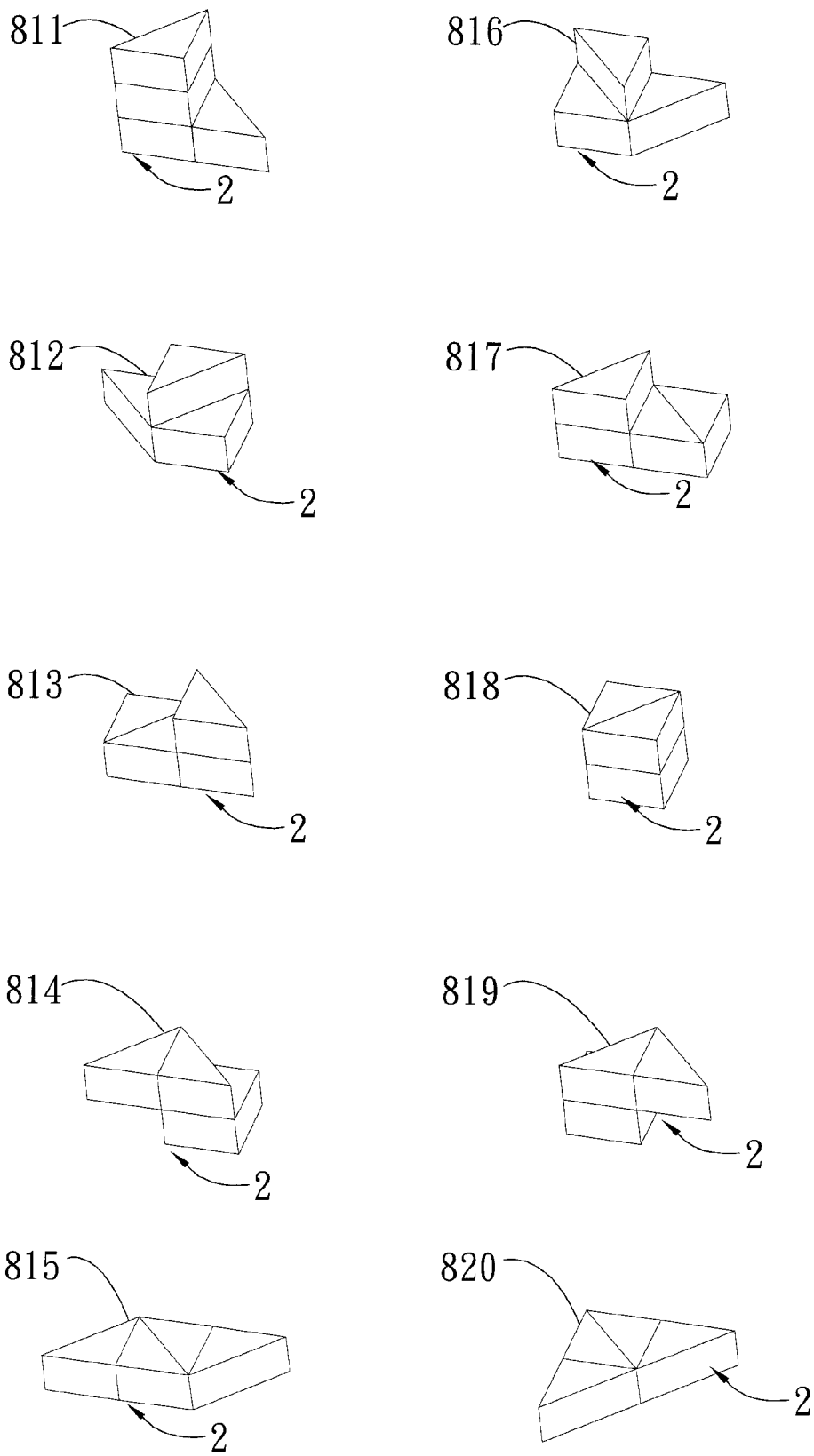
FIG. 9B illustrates symmetric-right-triangle-based shaped blocks respectively designated as D11-D20 according to the present invention.
Figure 9C:
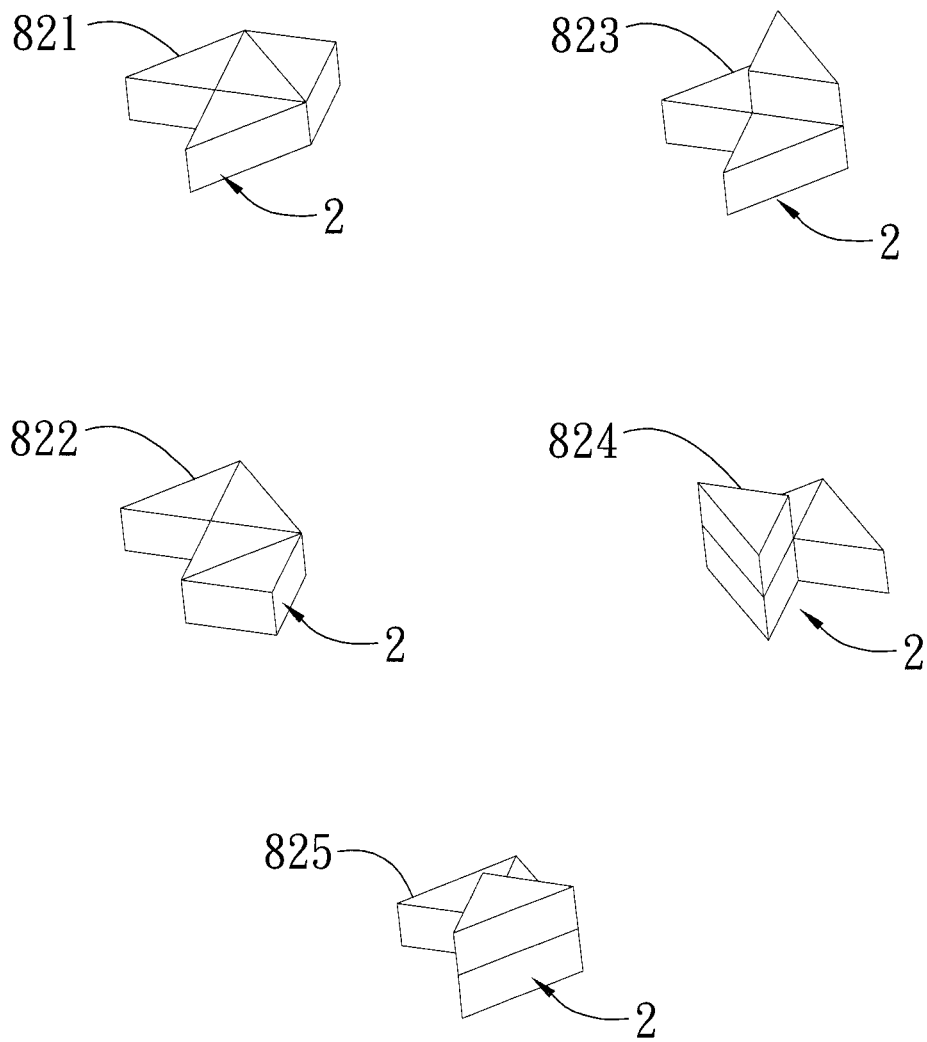
FIG. 9C illustrates symmetric-right-triangle-based shaped blocks respectively designated as D21-D25 according to the present invention.

In a fourth embodiment of the present invention, as shown in FIG. 9, a stacked arrangement (11) in the form of a parallelepiped is provided, comprising six layers from the bottom to the top, each including 8 unit cell (3), so that there are totally 48 symmetric-right-triangle-based unit cells (3). The stacked arrangement (11) is constructed by stacking in a manner of maximum density. As shown in FIGS. 9A-9C, totally 25 different symmetric-right-triangle-based shaped blocks D1-D25 (respectively designated at 801-825) are obtained.

Figure 10:
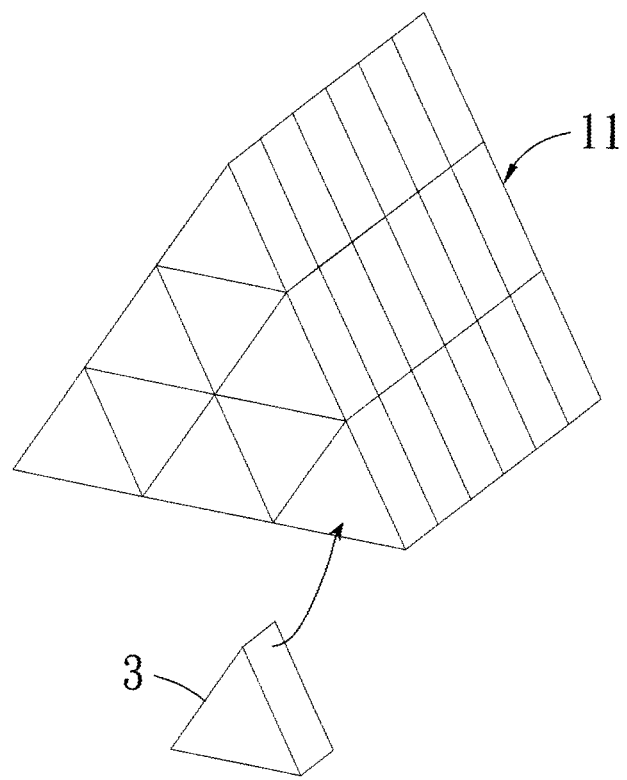
FIG. 10 illustrates a stacked arrangement formed of regular triangles according to the present invention.
Figure 10B:
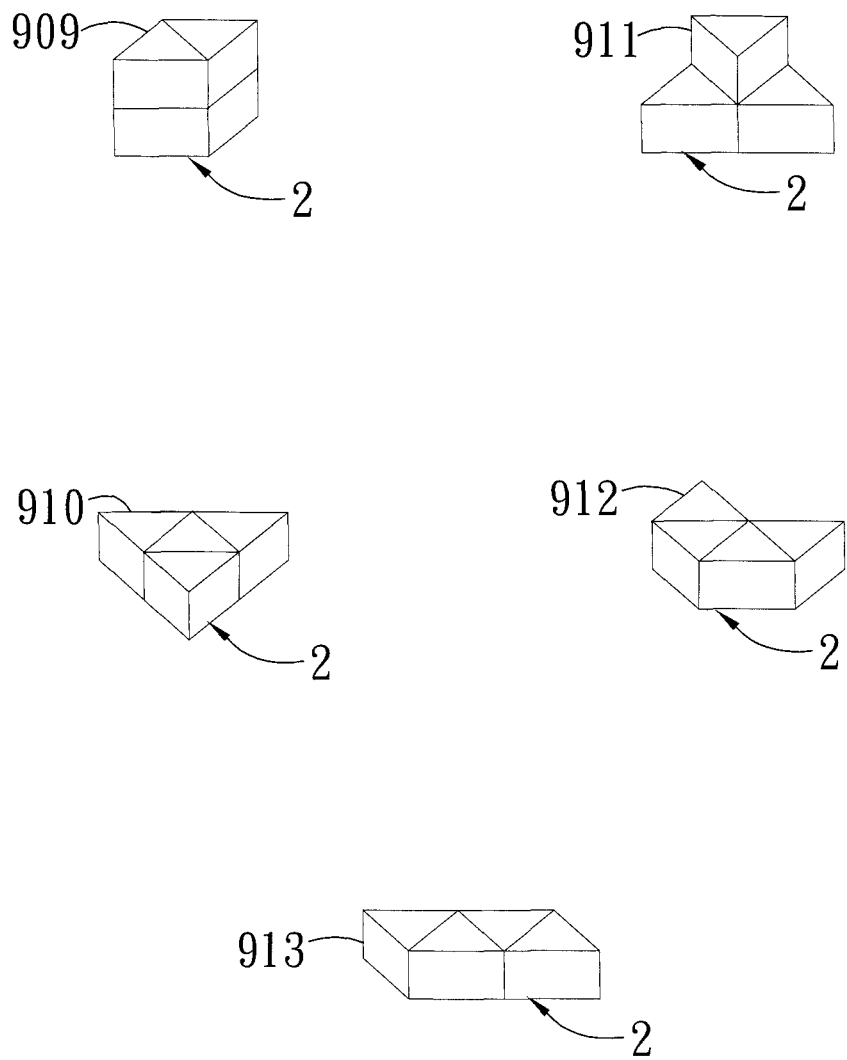
FIG. 10B illustrates regular-triangle-based shaped blocks respectively designated as E9-E13 according to the present invention.

In a fifth embodiment of the present invention, as shown in FIG. 10, a stacked arrangement (11) in the form of a triangular prism is provided, each layer comprising 9 unit cells (3) and six layers in total, so that there are totally 36 regular-triangle-based unit cells (3). The stacked arrangement (11) is constructed by stacking in a manner of maximum density. As shown in FIGS. 10A-10B, totally 13 different regular-triangle-based shaped blocks E1-E13 (respectively designated at 901-913) can be extracted.

Figure 11:
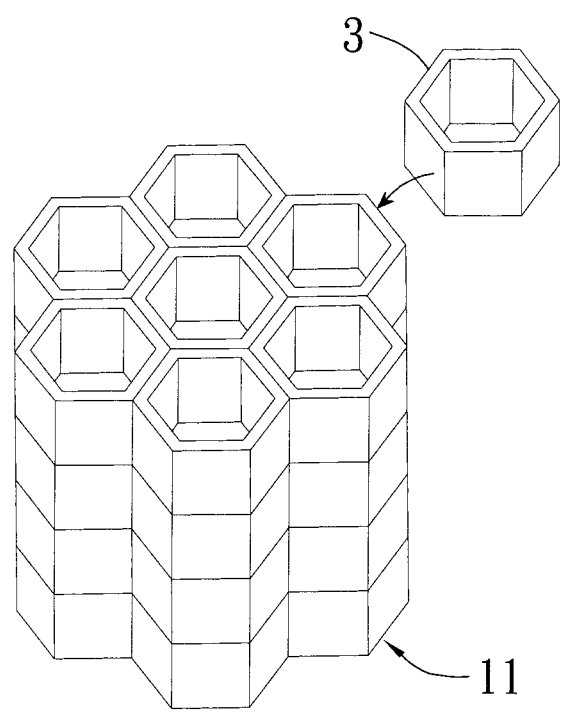
FIG. 11 illustrates a stacked arrangement formed of hexagons according to the present invention.
Figure 11B:
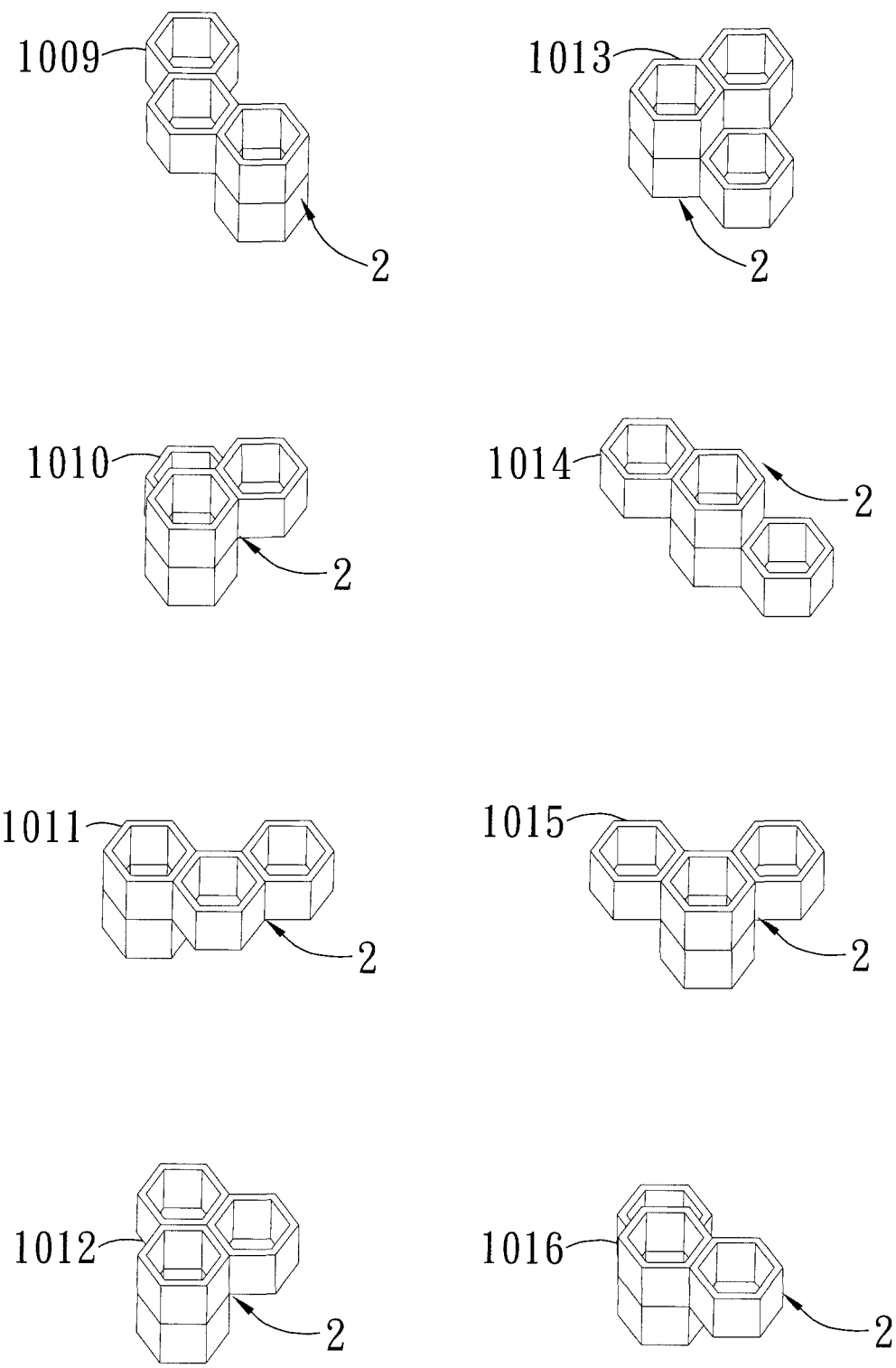
FIG. 11B illustrates hexagon-based shaped blocks respectively designated as F9-F16 according to the present invention.
Figure 11C:
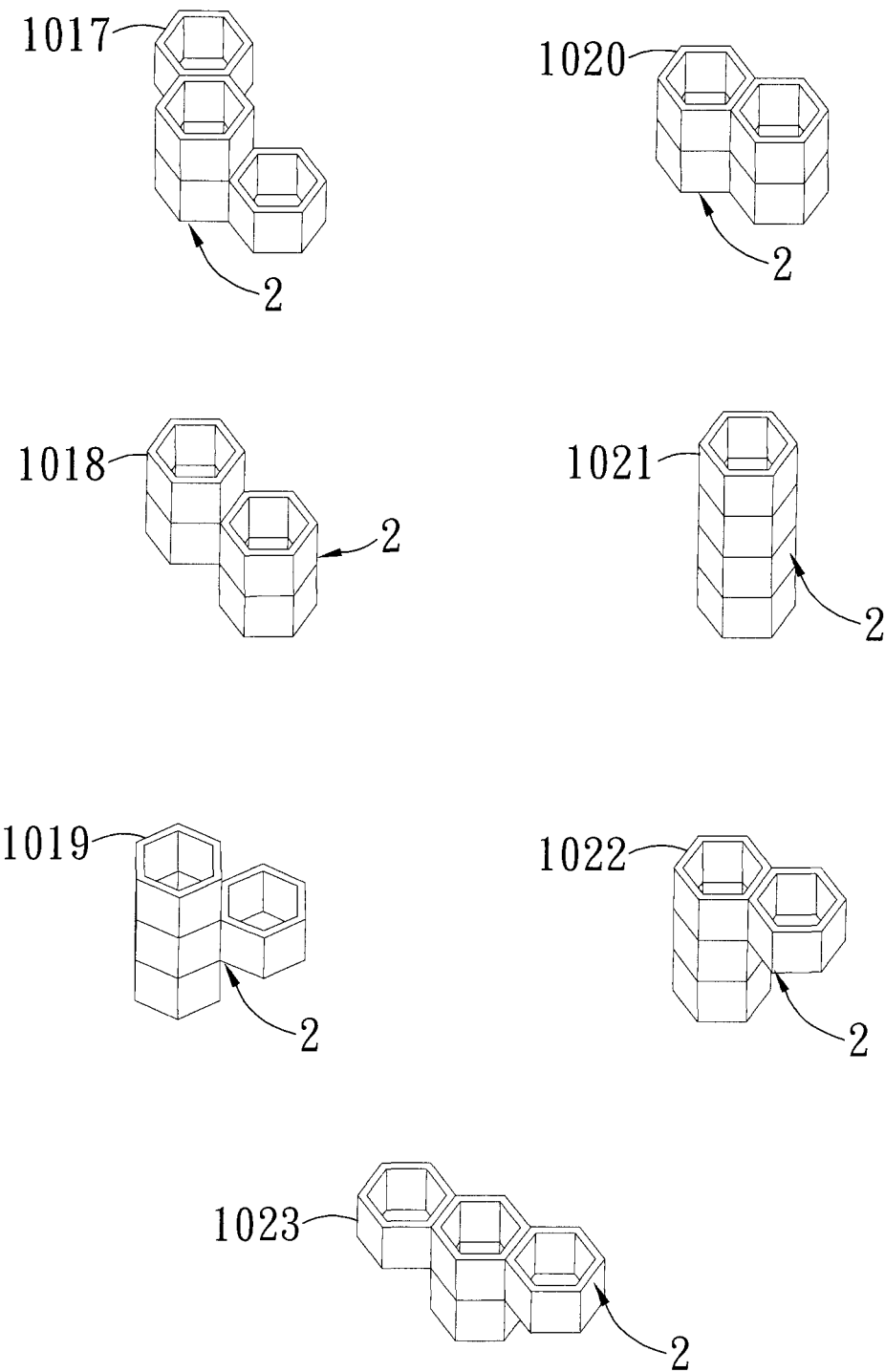
FIG. 11C illustrates hexagon-based shaped blocks respectively designated as F18-F23 according to the present invention.

In a sixth embodiment of the present invention, as shown in FIG. 11, a stacked arrangement (11) of hexagons in the form of a hexangular body is provided, each layer comprising 7 unit cells (3) and four layers in total, so that there are totally 28 regular-hexagon-based unit cells (3). The stacked arrangement (11) is constructed by stacking in a manner of maximum density. As shown in FIGS. 11A-11C, totally 23 different regular-hexagon-based shaped blocks F1-F23 (respectively designated at 1001-1023) can be extracted.

Figure 12:
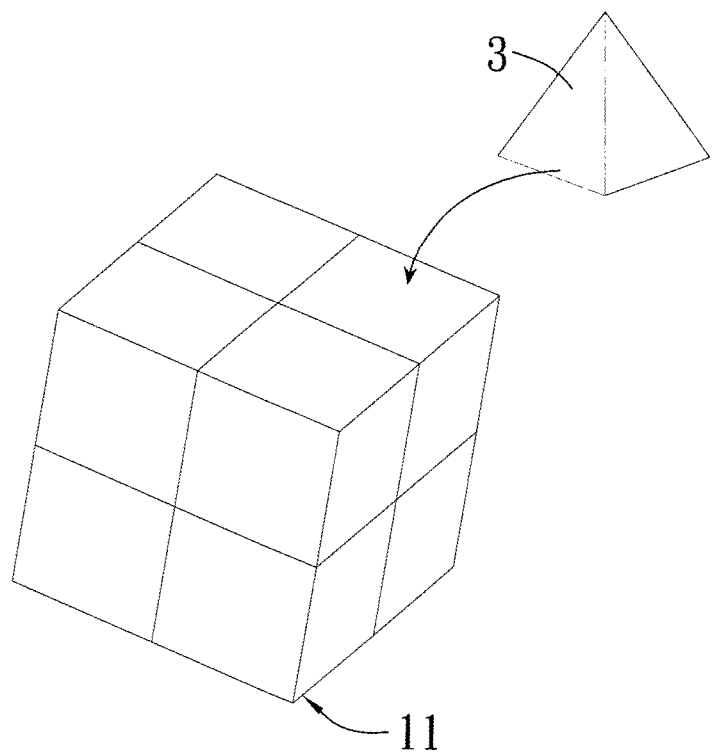
FIG. 12 illustrates a stacked arrangement formed of tetrahedrons according to the present invention.
Figure 12A:
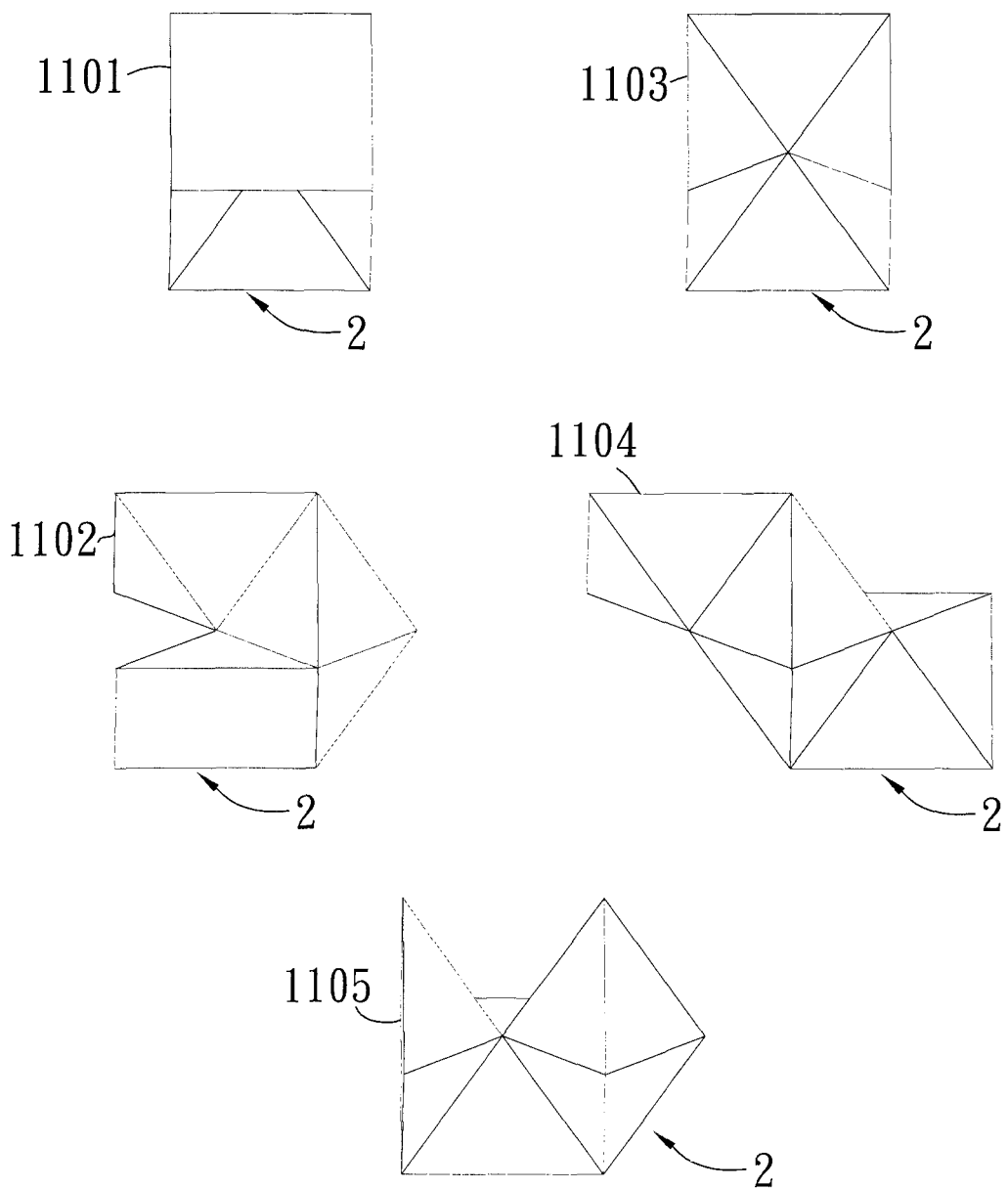
FIG. 12A illustrates tetrahedron-based shaped blocks respectively designated as G1-G5 according to the present invention.
Figure 12B:
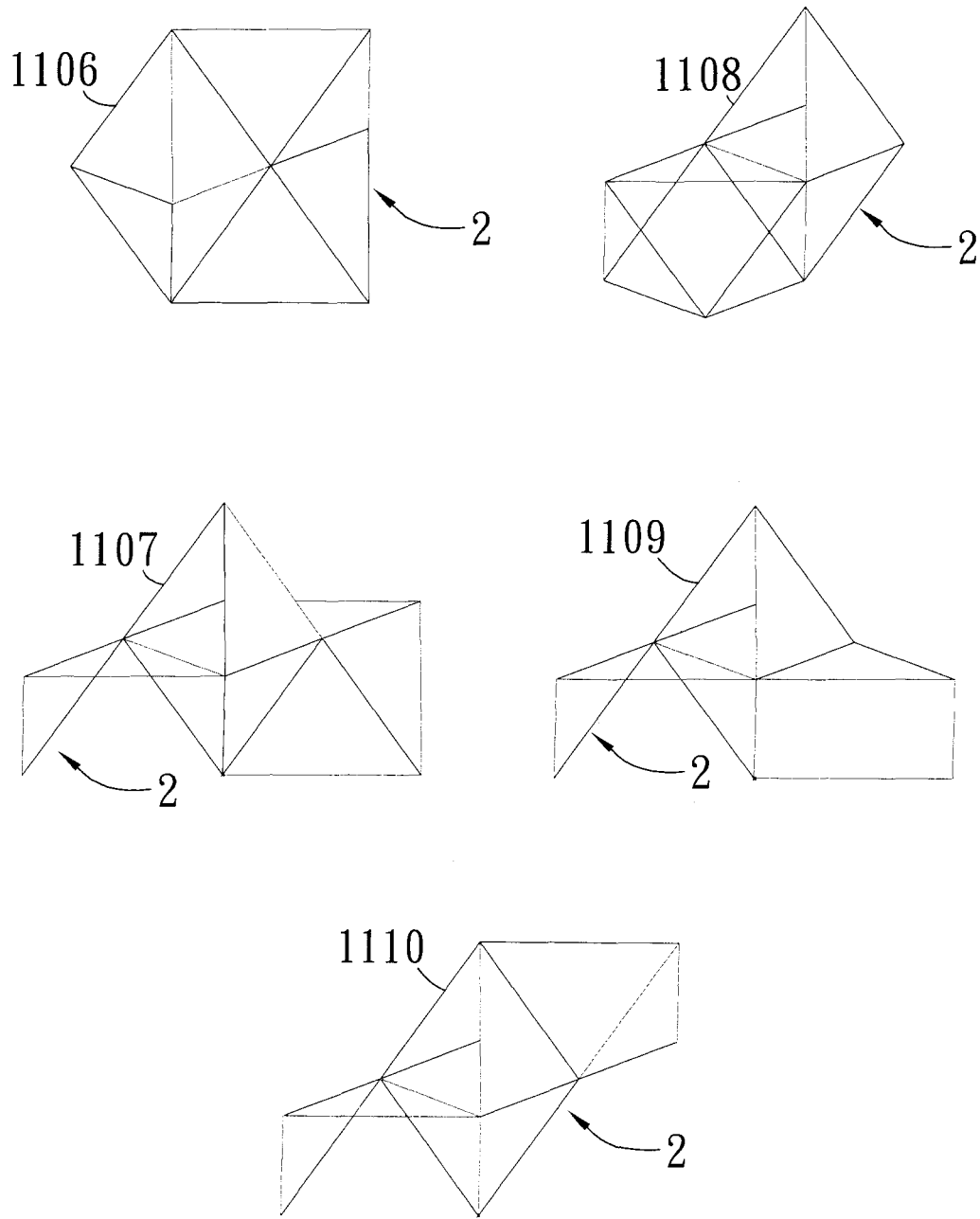
FIG. 12B illustrates tetrahedron-based shaped blocks respectively designated as G6-G10 according to the present invention.

In a seventh embodiment of the present invention, as shown in FIG. 12, a stacked arrangement (11) in the form of a cube is provided, each layer comprising 16 unit cells (3) and two layers in total, so that there are totally 32 tetrahedron-based unit cells (3). The stacked arrangement (11) is constructed by stacking in a manner of maximum density. As shown in FIGS. 12A-12B, totally 10 different tetrahedron-based shaped blocks G1-G10 (respectively designated at 1101-1110) can be extracted.

In the above discussed second to seventh embodiments, different and non-repeated shaped blocks (2) can be extracted from the stacked arrangement (11) of each of the drawings and each of the stacked arrangements (11) may serve as a target structure (1). There is no specific rule in this respect. Details and better understanding can be achieved by referring to the embodiment illustrated in FIG. 1 and repeated description will be omitted.

In summary, the present invention provides a densely stackable building block system and a method thereof, in which seven different examples of unit cells (3) are provided and unit cells (3) of each different type are stacked to form a stacked arrangement (11) through a stacking manner having the maximum density of the unit cell (3) and extraction is made based on the conditions of same kind, identical connection facet, and same quantity so that formation of shaped blocks (2) that are all three-dimensional and different and not repeated can be achieved, this, in combination with diverse and versatile target structures (1), making it possible to train the logic thinking capability of a user. Compared to the commercially available building block kits, which are simply designed to match the desired solutions, the present invention provides a building block system that has versatile and diverse forms of assembly.

It will be understood that each of the elements described above, or two or more together may also find a useful application in other types of methods differing from the type described above.

Spheres of a number of four are extracted from the regular triangular pyramid

Referring back to the embodiment shown in FIGS. 7, 7A, 7B and 7C. Although various (totally twenty-five) configurations of blocks 601-625 are extracted from the stacked arrangement 11 in the shape of regular triangular pyramid, in which, each block 601-625 is composed of exactly four spherical unit cells 3, however, the method to stack these blocks to form the regular-triangular-pyramid shaped stacked arrangement 11 is also interesting to discuss. It is understood that, because the regular-triangular-pyramid shaped stacked arrangement 11 shown in FIG. 7 contains exactly twenty spherical unit cells 3, therefore, exactly five blocks will be required in order to assemble the regular triangular pyramid 11. However, choosing these five blocks among the totally twenty-five blocks 601-625 is not an easy job, since some combinations of the blocks cannot be stacked in the same regular-triangular-pyramid shaped stacked arrangement 11 due to the inevitable interferences of the contours of the blocks. For example, it is impossible to form the regular-triangular-pyramid shaped stacked arrangement 11 by using the five blocks 617-620, nor the other five blocks 620-625. Some combinations of five blocks chosen from the twenty-five blocks 601-625 might has only one answer (i.e., one sequence) to stack them to form the regular-triangular-pyramid shaped stacked arrangement 11. However, some other combinations of five blocks chosen from the twenty-five blocks 601-625 might has two or more answers (i.e., sequences) to stack them to form the regular-triangular-pyramid shaped stacked arrangement 11. It is obvious that, the more answers that a set of five blocks can form the regular-triangular-pyramid shaped stacked arrangement 11, the more pleasures, funs, alterations and senses of fulfillments can be obtained when playing the blocks.

In view of the above, the present invention provides a densely stackable building block system, which comprises a stand and exactly five three-dimensional blocks 616,602, 601,603,615 which are especially pre-selected from the twenty-five blocks 601-625 previously illustrated in FIGS. 7A to 7C. Each block is composed of exactly four identical spheres. Configurations of the five blocks are different from each other. The five blocks are combinable with each other to form a detachable stacked arrangement which is in a shape of a regular triangular pyramid (i.e., a regular tetrahedron) having exactly four identical triangular-shaped surfaces. The stand is formed with ten concaves for accommodating a portion of a bottom layer of the stacked arrangement. The five blocks are stackable on the stand to form the stacked arrangement shaped as the regular triangular pyramid by at least four different sequences (i.e., at least four different answers to stack these five blocks into the regular-triangular-pyramid shaped stacked arrangement 11). Therefore, more pleasures, funs, alterations and senses of fulfillments can be obtained when playing the specially selected five blocks 616,602,601,603,615 of the densely stackable building block system in accordance with the present invention described below.

Figure 14:
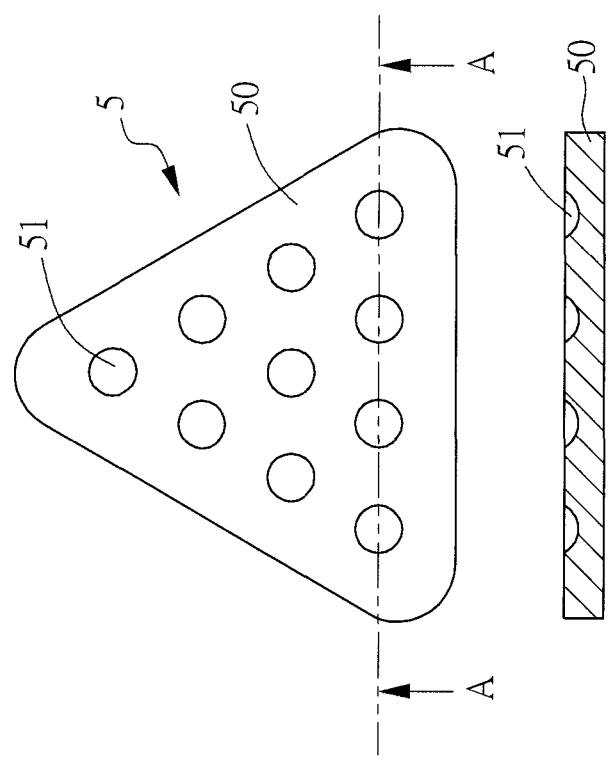
FIG. 14 illustrates a top view and a cross-sectional view of the stand in accordance with the present invention.
Figure 15:
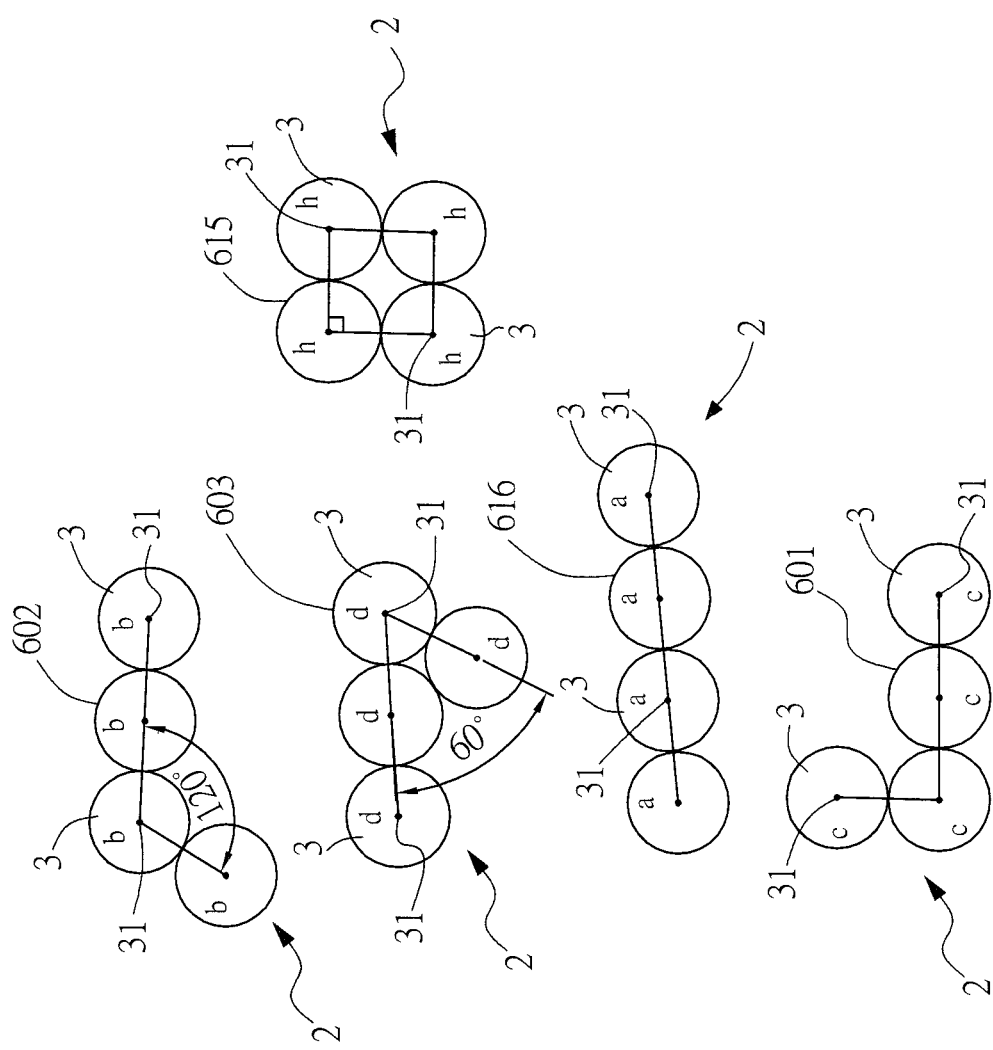
FIG. 15 illustrates the different configurations of the five blocks for assembling the regular-triangular-pyramid shaped stacked arrangement in accordance with the present invention.

Please refer to FIGS. 13, 14 and 15, in which, FIG. 13 illustrates an embodiment of the densely stackable building block system comprising a stand 5 for supporting a regular-triangular-pyramid shaped stacked arrangement 11 in accordance with the present invention, FIG. 14 illustrates a top view and a cross-sectional view of the stand 5 in accordance with the present invention, and FIG. 15 illustrates the different configurations of the five blocks for assembling the regular-triangular-pyramid shaped stacked arrangement in accordance with the present invention.

As shown in FIGS. 13 and 14, the stand 5 has a top surface 50 and exactly ten concaves 51 formed on the top surface 50. The ten concaves 51 are arranged in a form of a regular triangle on the top surface 50. The regular triangle has three sides of equal length, wherein, each one of the sides is countable of four concaves 51.

The regular-triangular-pyramid shaped stacked arrangement 11 shown in FIG. 13 can be acquired by stacking exactly five three-dimensional blocks shown in FIG. 15 on the stand. These five blocks include a first block 616, a second block 602, a third block 601, a fourth block 603 and a fifth block 615. Each of the blocks 616,602,601,603,615 is respectively composed of exactly four spherical unit cells 3 including a first sphere, a second sphere, a third sphere and a fourth sphere. Each of the spheres 3 is spherical in shape and having an outer surface and a center 31 defined therein. Each of the spheres 3 is exactly the same shape and size with each other. Each of the spheres 3 is fixed to at least one neighboring sphere 3 of the same block 616,602,601,603, 615 in such a manner that, the four spheres 3 of the same block 616,602,601,603,615 cannot be detached. Configurations of these five blocks 616,602,601,603,615 are different from each other.

The first block 616 has a first configuration that, the four spheres 3 of the first block 616 are all located on a horizontal plane in such a manner that, the outer surface of the first sphere 3 of the first block 616 is fixedly attached to only the outer surface of the second sphere 3 of the first block 616, the outer surface of the second sphere 3 of the first block 616 is fixedly attached to the outer surfaces of both the first and the third spheres 3 of the first block 616, the outer surface of the third sphere 3 of the first block 616 is fixedly attached to the outer surfaces of both the second and the fourth spheres 3 of the first block 616, and the outer surface of the fourth sphere 3 of the first block 616 is fixedly attached to only the outer surface of the third sphere 3 of the first block 616. In addition, the centers 31 of all of the first, second, third and fourth spheres 3 of the first block 616 are located on a same straight line.

The second block 602 has a second configuration that, the four spheres 3 of the second block 602 are all located on the horizontal plane in such a manner that, the outer surface of the first sphere 3 of the second block 602 is fixedly attached to only the outer surface of the second sphere 3 of the second block 602, the outer surface of the second sphere 3 of the second block 602 is fixedly attached to the outer surfaces of both the first and the third spheres 3 of the second block 602, the outer surface of the third sphere 3 of the second block 602 is fixedly attached to the outer surfaces of both the second and the fourth spheres 3 of the second block 602, the outer surface of the fourth sphere 3 of the second block 602 is fixedly attached to only the outer surface of the third sphere 3 of the second block 602. In addition, the center 31 of the third sphere 3 of the second block 602 is locate right in a middle of a first virtual line defined by the centers 31 of the second and the fourth spheres 3 of the second block 602. The centers 31 of the second and the first spheres 3 of the second block 602 define a second virtual line. An included angle defined by the first virtual line and the second virtual line is 120 degrees.

The third block 601 has a third configuration that, the four spheres 3 of the third block 601 are all located on the horizontal plane in such a manner that, the outer surface of the first sphere 3 of the third block 601 is fixedly attached to only the outer surface of the second sphere 3 of the third block 601, the outer surface of the second sphere 3 of the third block 601 is fixedly attached to the outer surfaces of both the first and the third spheres 3 of the third block 601, the outer surface of the third sphere 3 of the third block 601 is fixedly attached to the outer surfaces of both the second and the fourth spheres 3 of the third block 601, the outer surface of the fourth sphere 3 of the third block 601 is fixedly attached to only the outer surface of the third sphere 3 of the third block 601. In addition, the center 31 of the third sphere 3 of the third block 601 is locate right in a middle of a third virtual line defined by the centers 31 of the second and the fourth spheres 3 of the third block 601. The centers 31 of the second and the first spheres 3 of the third block 601 define a fourth virtual line. An included angle defined by the third virtual line and the fourth virtual line is 90 degrees.

The fourth block 603 has a fourth configuration that, the four spheres 3 of the fourth block 603 are all located on the horizontal plane in such a manner that, the outer surface of the first sphere 3 of the fourth block 603 is fixedly attached to the outer surfaces of both the second and the third spheres 3 of the fourth block 603, the outer surface of the second sphere 3 of the fourth block 603 is fixedly attached to the outer surfaces of both the first and the third spheres 3 of the fourth block 603, the outer surface of the third sphere 3 of the fourth block 603 is fixedly attached to the outer surfaces of the first, the second and the fourth spheres 3 of the fourth block 603, the outer surface of the fourth sphere 3 of the fourth block 603 is fixedly attached to only the outer surface of the third sphere 3 of the fourth block 603. In addition, the center 31 of the third sphere 3 of the fourth block 603 is locate right in a middle of a fifth virtual line defined by the centers 31 of the second and the fourth spheres 3 of the fourth block 603. The centers 31 of the second and the first spheres 3 of the fourth block 603 define a sixth virtual line. An included angle defined by the fifth virtual line and the sixth virtual line is 60 degrees.

The fifth block 615 has a fifth configuration that, the four spheres 3 of the fifth block 615 are all located on the horizontal plane in such a manner that, the outer surface of the first sphere 3 of the fifth block 615 is fixedly attached to the outer surfaces of both the second and the fourth spheres 3 of the fifth block 615, the outer surface of the second sphere 3 of the fifth block 615 is fixedly attached to the outer surfaces of both the first and the third spheres 3 of the fifth block 615, the outer surface of the third sphere 3 of the fifth block 615 is fixedly attached to the outer surfaces of both the second and the fourth spheres 3 of the fifth block 615, the outer surface of the fourth sphere 3 of the fifth block 615 is fixedly attached to the outer surfaces of both the third and the first spheres 3 of the fifth block 615. In addition, the centers 31 of the first, second, third and fourth spheres 3 of the fifth block 615 defines a virtual square.

These first to fifth blocks 616,602,601,603,615 are combinable with each other to form the detachable stacked arrangement 11 shown in FIG. 13 which is in a shape of a regular triangular pyramid (i.e., a regular tetrahedron) having exactly four identical triangular-shaped surfaces. This stacked arrangement 11 is composed of four layers that are vertically stacked, wherein, these four layers from bottom to top thereof respectively include exactly ten spheres 3, six spheres 3, three spheres 3 and one sphere 3, so that the stacked arrangement 11 is composed of exactly twenty spheres 3 in total. In addition, each of the triangular-shaped surfaces is countable of exactly ten spheres 3. The ten concaves 51 of the stand 5 are sized and shaped for accommodating a portion of the ten spheres 3 which are belong to the bottom layer of the stacked arrangement 11.

Please refer to FIGS. 16A, 16B, 16C and 16D, which illustrate four different sequences for stacking the five blocks shown in FIG. 15 to form the stacked arrangement 11 of the present invention. In this embodiment of the densely stackable building block system of the present invention, the five blocks 616,602,601,603,615 shown in FIG. 15 are stackable on the stand 5 to form the stacked arrangement 11 shaped as the regular triangular pyramid by one of at least four different sequences (A), (B), (C) and (D) stated below.

Figure 16A:
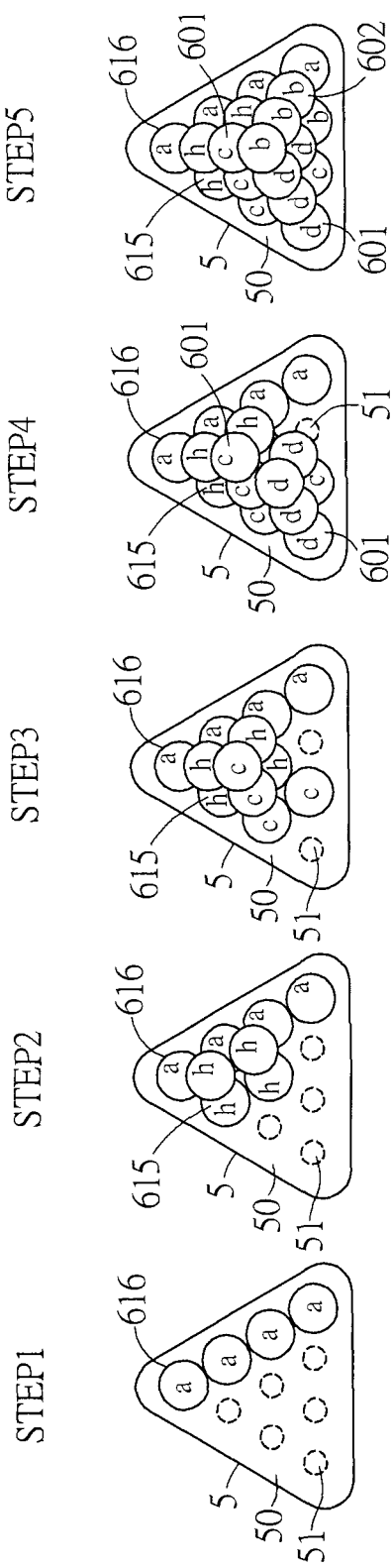
FIGS. 16A, 16B, 16C and 16D illustrate four different sequences for stacking the five blocks shown in FIG. 15 to form the stacked arrangement of the present invention.

Sequence (A), as illustrated in FIG. 16A:

STEP 1, firstly, stacking the four spheres (marked with the letter "a" in FIG. 16A) of the first block 616 on the four concaves 51 of one of the sides of the regular triangle on the top surface 50 of the stand 5;

STEP 2, secondly, stacking the first and second spheres (marked with the letter "h" in FIG. 16A) of the fifth block 615 on the concaves 51 neighboring the first and second spheres of the first block 616, and having the third sphere of the fifth block 615 contacting upper parts of both the first and second spheres of the first block 616, and also having the fourth sphere of the fifth block 615 contacting upper parts of both the second and third spheres of the first block 616;

STEP 3, thirdly, stacking the first and second spheres (marked with the letter "c" in FIG. 16A) of the third block 601 on the concaves 51 neighboring the first and second spheres of the fifth block 615, and having the third sphere of the third block 601 contacting upper parts of both the first and second spheres of the fifth block 615, and also having the fourth sphere of the third block 601 contacting upper parts of both the third and fourth spheres of the fifth block 615;

STEP 4, fourthly, stacking the fourth sphere (marked with the letter "d" in FIG. 16A) of the fourth block 603 on the concave 51 neighboring the first and second spheres of the third block 601, and having the third sphere of the fourth block 603 contacting upper parts of both the first and second spheres of the third block 601 such that the third sphere of the fourth block 603 is neighboring the third sphere of the third block 601, and having the second sphere of the fourth block 603 contacting an upper part of the third sphere of the third block 601 such that the second sphere of the fourth block 603 is neighboring the fourth sphere of the third block 601, and having the first sphere of the fourth block 603 contacting an upper part of the first sphere of the third block 601 and another upper part of the first sphere of the fifth block 615 such that the first sphere of the fourth block 603 is neighboring the third sphere of the third block 601 and the fourth sphere of the fifth block 615; and STEP 5, finally, stacking the first sphere (marked with the letter "b" in FIG. 16A) of the second block 602 on the concave 51 neighboring the third and fourth spheres of the first block 616, and having the second sphere of the second block 602 contacting upper parts of both the third and fourth spheres of the first block 616 such that the second sphere of the second block 602 is neighboring both the first sphere of the fourth block 603 and the fourth sphere of the fifth block 615, and having the third sphere of the second block 602 contacting upper parts of both the first sphere of the fourth block 603 and the fourth sphere of the fifth block 615 such that the third sphere of the second block 602 is neighboring the fourth sphere of the third block 601 and the second sphere of the fourth block 603, and having the fourth sphere of the second block 602 contacting upper parts of both the fourth sphere of the third block 601 and the second sphere of the fourth block 603 such that the fourth sphere of the second block 602 is located at the top of stacked arrangement 11, and thus forming the stacked arrangement 11 in the shape of regular triangular pyramid.

Figure 16B:
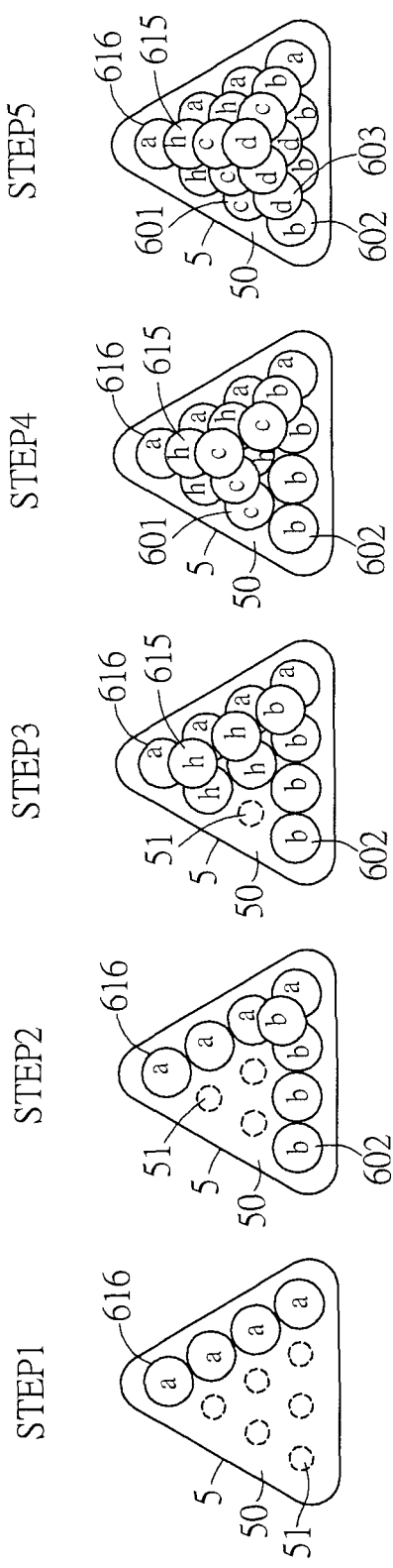

Sequence (B), as illustrated in FIG. 16B:

STEP 1, firstly, stacking the four spheres (marked with the letter "a" in FIG. 16B) of the first block 616 on the four concaves 51 of one of the sides of the regular triangle on the top surface 50 of the stand 5;

STEP 2, secondly, stacking the second, third and fourth spheres (marked with the letter "b" in FIG. 16B) of the second block 602 on the concaves 51 of another one of the sides of the regular triangle on the top surface 50 of the stand 5, and having the first sphere of the second block 602 contacting upper parts of both the third and fourth spheres of the first block 616;

STEP 3, thirdly, stacking the first and second spheres (marked with the letter "h" in FIG. 16B) of the fifth block 615 on the concaves 51 neighboring the first and second spheres of the first block 616, and having the third sphere of the fifth block 615 contacting upper parts of both the first and second spheres of the first block 616, and also having the fourth sphere of the fifth block 615 contacting upper parts of both the second and third spheres of the first block 616 such that the fourth sphere of the fifth block 615 is neighboring the first sphere of the second block 602;

STEP 4, fourthly, stacking the fourth sphere (marked with the letter "c" in FIG. 16B) of the third block 601 on the concave 51 locating between the fourth sphere of the second block 602 and the second sphere of the fifth block 615, having the third sphere of the third block 601 contacting upper parts of both the first and second spheres of the fifth block 615 such that the third sphere of the third block 601 is neighboring the third and fourth spheres of the fifth block 615, and having the second sphere of the third block 601 contacting upper parts of both the third and fourth spheres of the fifth block 615, and also having the first sphere of the third block 601 contacting upper parts of both the fourth sphere of the fifth block 615 and the first sphere of the second block 602; and STEP 5, finally, stacking the fourth sphere (marked with the letter "d" in FIG. 16B) of the fourth block 603 right on a middle of upper parts of the fourth sphere of the third block 601 and the third and fourth spheres of the second block 602 such that the fourth sphere of the fourth block 603 is neighboring the third sphere of the third block 601, having the first sphere of the fourth block 603 stacking right on a middle of upper parts of the first sphere of the fifth block 615 and the second and third spheres of the second block 602 such that the first sphere of the fourth block 603 is neighboring all the first sphere of the second block 602, the fourth sphere of the fifth block 615 and the third sphere of the third block 601, and having the third sphere of the fourth block 603 contacting an upper part of the third sphere of the third block 601 such that the third sphere of the fourth block 603 is neighboring both the first and second spheres of the third block 601, and also having the second sphere of the fourth block 603 contacting upper parts of both the first and second spheres of the third block 601 such that the second sphere of the fourth block 603 is located at the top of stacked arrangement 11, and thus forming the stacked arrangement 11 in the shape of regular triangular pyramid.

Figure 16C:
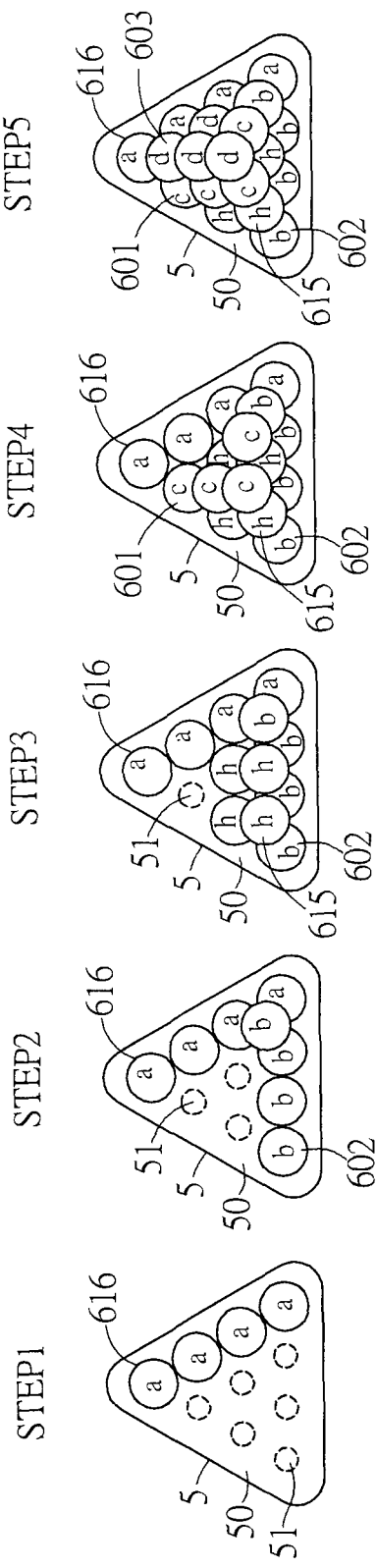

Sequence (C), as illustrated in FIG. 16C:

STEP 1, firstly, stacking the four spheres (marked with the letter "a" in FIG. 16C) of the first block 616 on the four concaves 51 of one of the sides of the regular triangle on the top surface 50 of the stand 5;

STEP 2, secondly, stacking the second, third and fourth spheres (marked with the letter "b" in FIG. 16C) of the second block 602 on the concaves 51 of another one of the sides of the regular triangle on the top surface 50 of the stand 5, and having the first sphere of the second block 602 contacting upper parts of both the third and fourth spheres of the first block 616;

STEP 3, thirdly, stacking the second and third spheres (marked with the letter "h" in FIG. 16C) of the fifth block 615 on the concaves 51 neighboring the fourth and third spheres of the second block 602, having the first sphere of the fifth block 615 contacting upper parts of both the third and fourth spheres of the second block 602, and having the fourth sphere of the fifth block 615 contacting upper parts of both the second and third spheres of the second block 602 such that the fourth sphere of the fifth block 615 is neighboring the first sphere of the second block 602;

STEP 4, fourthly, stacking the fourth sphere (marked with the letter "c" in FIG. 16C) of the third block 601 on the concave 51 locating between the first sphere of the first block 616 and the second sphere of the fifth block 615, having the third sphere of the third block 601 contacting upper parts of both the second and third spheres of the fifth block 615 such that the third sphere of the third block 601 is neighboring the first and fourth spheres of the fifth block 615, and having the second sphere of the third block 601 contacting upper parts of both the first and fourth spheres of the fifth block 615, and also having the first sphere of the third block 601 contacting upper parts of both the fourth sphere of the fifth block 615 and the first sphere of the second block 602; and STEP 5, finally, stacking the fourth sphere (marked with the letter "d" in FIG. 16C) of the fourth block 603 right on a middle of upper parts of the fourth sphere of the third block 601 and the first and second spheres of the first block 616 such that the fourth sphere of the fourth block 603 is neighboring the third sphere of the third block 601, having the first sphere of the fourth block 603 stacking right on a middle of upper parts of the third sphere of the fifth block 615 and the second and third spheres of the first block 616 such that the first sphere of the fourth block 603 is neighboring all the first sphere of the second block 602, the fourth sphere of the fifth block 615 and the third sphere of the third block 601, and having the third sphere of the fourth block 603 contacting an upper part of the third sphere of the third block 601 such that the third sphere of the fourth block 603 is neighboring both the first and second spheres of the third block 601, and also having the second sphere of the fourth block 603 contacting upper parts of both the first and second spheres of the third block 601 such that the second sphere of the fourth block 603 is located at the top of stacked arrangement 11, and thus forming the stacked arrangement 11 in the shape of regular triangular pyramid.

Figure 16D:
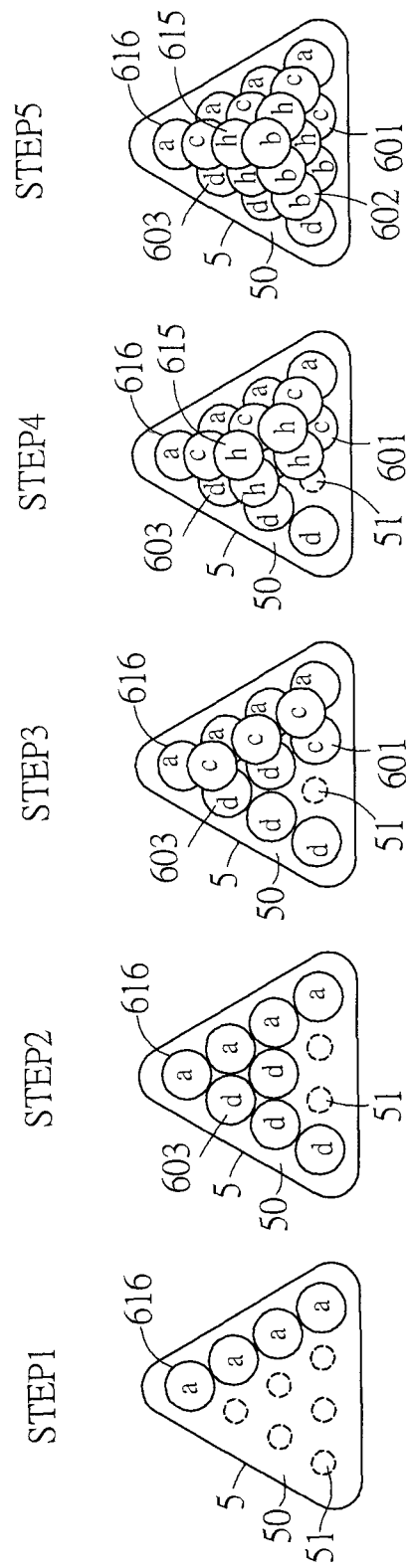

Sequence (D), as illustrated in FIG. 16D:

STEP 1, firstly, stacking the four spheres (marked with the letter "a" in FIG. 16D) of the first block 616 on the four concaves 51 of one of the sides of the regular triangle on the top surface 50 of the stand 5;

STEP 2, secondly, stacking the second, third and fourth spheres (marked with the letter "d" in FIG. 16D) of the fourth block 603 on the concaves 51 of another one of the sides of the regular triangle on the top surface 50 of the stand 5, and having the first sphere of the fourth block 603 stacking on the concave 51 neighboring the second and third spheres of the first block 616;

STEP 3, thirdly, stacking the first sphere (marked with the letter "c" in FIG. 16D) of the third block 601 on the concave 51 neighboring the first sphere of the fourth block 603 as well as the third and fourth spheres of the first block 616, having the second sphere of the third block 601 contacting upper parts of both the third and fourth spheres of the first block 616, and having the third sphere of the third block 601 contacting upper parts of the first sphere of the fourth block 603 as well as the second and third spheres of the first block 616, and also having the fourth sphere of the third block 601 contacting upper parts of the second sphere of the fourth block 603 as well as the first and second spheres of the first block 616;

STEP 4, fourthly, stacking the first sphere (marked with the letter "h" in FIG. 16D) of the fifth block 615 right on a middle of upper parts of the first, second and third spheres of the fourth block 603 such that the first sphere of the fifth block 615 is neighboring the third and fourth spheres of the third block 601, having the second sphere of the fifth block 615 contacting upper parts of both the third and fourth spheres of the third block 601, and having the third sphere of the fifth block 615 contacting upper parts of both the second and third spheres of the third block 601, and also having the fourth sphere of the fifth block 615 contacting upper parts of both the first sphere of the third block 601 and the first sphere of the fourth block 603 such that the fourth sphere of the fifth block 615 is neighboring the second and third spheres of the third block 601; and STEP 5, finally, stacking the first sphere (marked with the letter "b" in FIG. 16D) of the second block 602 on the concave located between the first sphere of the third block 601 and the fourth sphere of the fourth block 603, having the second sphere of the second block 602 contacting upper parts of both the third and fourth spheres of the fourth block 603 such that the second sphere of the second block 602 is neighboring the first and fourth spheres of the fifth block 615, and having the third sphere of the second block 602 contacting upper parts of both the first and fourth spheres of the fifth block 615 such that the third sphere of the second block 602 is neighboring the second and third spheres of the fifth block 615, and also having the fourth sphere of the second block 602 contacting upper parts of both the second and third spheres of the fifth block 615 such that the fourth sphere of the second block 602 is located at the top of stacked arrangement 11, and thus forming the stacked arrangement 11 in the shape of regular triangular pyramid.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:
1. A densely stackable building block system, comprising:
a stand, said stand having a top surface and exactly ten concaves formed on the top surface, said ten concaves being arranged in a form of a regular triangle on the top surface, said regular triangle having three sides, each of said sides being countable of four said concaves; and
exactly five three-dimensional blocks including a first block, a second block, a third block, a fourth block and a fifth block; each of said blocks being respectively composed of exactly four spherical unit cells which include a first sphere, a second sphere, a third sphere and a fourth sphere; each of said spheres being spherical in shape and having an outer surface and a center defined therein; each of said spheres being exactly the same shape and size with each other; each of said spheres being fixed to at least one neighboring sphere of the same block in such a manner that, the four spheres of the same block cannot be detached; configurations of the five blocks being different from each other; wherein:
the first block has a first configuration that, the four spheres of the first block are all located on a horizontal plane in such a manner that, the outer surface of the first sphere of the first block is fixedly attached to only the outer surface of the second sphere of the first block, the outer surface of the second sphere of the first block is fixedly attached to the outer surfaces of both the first sphere and the third sphere of the first block, the outer surface of the third sphere of the first block is fixedly attached to the outer surfaces of both the second sphere and the fourth sphere of the first block, the outer surface of the fourth sphere of the first block is fixedly attached to only the outer surface of the third sphere of the first block; in addition, the centers of all of the first, second, third and fourth spheres of the first block are located on a same straight line;
the second block has a second configuration that, the four spheres of the second block are all located on the horizontal plane in such a manner that, the outer surface of the first sphere of the second block is fixedly attached to only the outer surface of the second sphere of the second block, the outer surface of the second sphere of the second block is fixedly attached to the outer surfaces of both the first sphere and the third sphere of the second block, the outer surface of the third sphere of the second block is fixedly attached to the outer surfaces of both the second sphere and the fourth sphere of the second block, the outer surface of the fourth sphere of the second block is fixedly attached to only the outer surface of the third sphere of the second block; in addition, the center of the third sphere of the second block is locate right in a middle of a first virtual line defined by the centers of the second sphere and the fourth sphere of the second block, the centers of the second sphere and the first sphere of the second block define a second virtual line, an included angle defined by the first virtual line and the second virtual line is 120 degrees;
the third block has a third configuration that, the four spheres of the third block are all located on the horizontal plane in such a manner that, the outer surface of the first sphere of the third block is fixedly attached to only the outer surface of the second sphere of the third block, the outer surface of the second sphere of the third block is fixedly attached to the outer surfaces of both the first sphere and the third sphere of the third block, the outer surface of the third sphere of the third block is fixedly attached to the outer surfaces of both the second sphere and the fourth sphere of the third block, the outer surface of the fourth sphere of the third block is fixedly attached to only the outer surface of the third sphere of the third block; in addition, the center of the third sphere of the third block is locate right in a middle of a third virtual line defined by the centers of the second sphere and the fourth sphere of the third block, the centers of the second sphere and the first sphere of the third block define a fourth virtual line, an included angle defined by the third virtual line and the fourth virtual line is 90 degrees;
the fourth block has a fourth configuration that, the four spheres of the fourth block are all located on the horizontal plane in such a manner that, the outer surface of the first sphere of the fourth block is fixedly attached to the outer surfaces of both the second sphere and the third sphere of the fourth block, the outer surface of the second sphere of the fourth block is fixedly attached to the outer surfaces of both the first sphere and the third sphere of the fourth block, the outer surface of the third sphere of the fourth block is fixedly attached to the outer surfaces of the first sphere, the second sphere and the fourth sphere of the fourth block, the outer surface of the fourth sphere of the fourth block is fixedly attached to only the outer surface of the third sphere of the fourth block; in addition, the center of the third sphere of the fourth block is locate right in a middle of a fifth virtual line defined by the centers of the second sphere and the fourth sphere of the fourth block, the centers of the second sphere and the first sphere of the fourth block define a sixth virtual line, an included angle defined by the fifth virtual line and the sixth virtual line is 60 degrees;
the fifth block has a fifth configuration that, the four spheres of the fifth block are all located on the horizontal plane in such a manner that, the outer surface of the first sphere of the fifth block is fixedly attached to the outer surfaces of both the second sphere and the fourth sphere of the fifth block, the outer surface of the second sphere of the fifth block is fixedly attached to the outer surfaces of both the first sphere and the third sphere of the fifth block, the outer surface of the third sphere of the fifth block is fixedly attached to the outer surfaces of both the second sphere and the fourth sphere of the fifth block, the outer surface of the fourth sphere of the fifth block is fixedly attached to the outer surfaces of both the third sphere and the first sphere of the fifth block; in addition, the centers of the first, second, third and fourth spheres of the fifth block define a virtual square;
the first to fifth blocks are stackable with each other to form a detachable stacked arrangement which is in a shape of a regular triangular pyramid having exactly four identical triangular-shaped surfaces, said stacked arrangement is composed of four layers that are vertically stacked, said four layers from bottom to top thereof respectively include exactly ten spheres, six spheres, three spheres and one sphere, so that the stacked arrangement is composed of exactly twenty spheres in total; in addition, each of the triangular-shaped surfaces is countable of exactly ten spheres; and said ten concaves of the stand are sized and shaped for accommodating a portion of the bottom layer of the stacked arrangement;

wherein, the five blocks are stackable on the stand to form the stacked arrangement shaped as the regular triangular pyramid by at least four different sequences.

2. The densely stackable building block system according to claim 1, wherein the five blocks are stackable on the stand to form said stacked arrangement shaped as the regular triangular pyramid by one of at least said four different sequences (A), (B), (C) and (D) stated below:

Sequence (A): firstly, stacking the four spheres of the first block on the four concaves of one of the sides of the regular triangle on the top surface of the stand; secondly, stacking the first and second spheres of the fifth block on the concaves neighboring the first and second spheres of the first block, and having the third sphere of the fifth block contacting upper parts of both the first and second spheres of the first block, and also having the fourth sphere of the fifth block contacting upper parts of both the second and third spheres of the first block; thirdly, stacking the first and second spheres of the third block on the concaves neighboring the first and second spheres of the fifth block, and having the third sphere of the third block contacting upper parts of both the first and second spheres of the fifth block, and also having the fourth sphere of the third block contacting upper parts of both the third and fourth spheres of the fifth block; fourthly, stacking the fourth sphere of the fourth block on the concave neighboring the first and second spheres of the third block, and having the third sphere of the fourth block contacting upper parts of both the first and second spheres of the third block such that the third sphere of the fourth block is neighboring the third sphere of the third block, and having the second sphere of the fourth block contacting an upper part of the third sphere of the third block such that the second sphere of the fourth block is neighboring the fourth sphere of the third block, and having the first sphere of the fourth block contacting an upper part of the first sphere of the third block and another upper part of the first sphere of the fifth block such that the first sphere of the fourth block is neighboring the third sphere of the third block and the fourth sphere of the fifth block; and finally, stacking the first sphere of the second block on the concave neighboring the third and fourth spheres of the first block, and having the second sphere of the second block contacting upper parts of both the third and fourth spheres of the first block such that the second sphere of the second block is neighboring both the first sphere of the fourth block and the fourth sphere of the fifth block, and having the third sphere of the second block contacting upper parts of both the first sphere of the fourth block and the fourth sphere of the fifth block such that the third sphere of the second block is neighboring the fourth sphere of the third block and the second sphere of the fourth block, and having the fourth sphere of the second block contacting upper parts of both the fourth sphere of the third block and the second sphere of the fourth block such that the fourth sphere of the second block is located at the top of stacked arrangement;

Sequence (B): firstly, stacking the four spheres of the first block on the four concaves of one of the sides of the regular triangle on the top surface of the stand; secondly, stacking the second, third and fourth spheres of the second block on the concaves of another one of the sides of the regular triangle on the top surface of the stand, and having the first sphere of the second block contacting upper parts of both the third and fourth spheres of the first block; thirdly, stacking the first and second spheres of the fifth block on the concaves neighboring the first and second spheres of the first block, and having the third sphere of the fifth block contacting upper parts of both the first and second spheres of the first block, and also having the fourth sphere of the fifth block contacting upper parts of both the second and third spheres of the first block such that the fourth sphere of the fifth block is neighboring the first sphere of the second block; fourthly, stacking the fourth sphere of the third block on the concave locating between the fourth sphere of the second block and the second sphere of the fifth block, having the third sphere of the third block contacting upper parts of both the first and second spheres of the fifth block such that the third sphere of the third block is neighboring the third and fourth spheres of the fifth block, and having the second sphere of the third block contacting upper parts of both the third and fourth spheres of the fifth block, and also having the first sphere of the third block contacting upper parts of both the fourth sphere of the fifth block and the first sphere of the second block; and finally, stacking the fourth sphere of the fourth block right on a middle of upper parts of the fourth sphere of the third block and the third and fourth spheres of the second block such that the fourth sphere of the fourth block is neighboring the third sphere of the third block, having the first sphere of the fourth block stacking right on a middle of upper parts of the first sphere of the fifth block and the second and third spheres of the second block such that the first sphere of the fourth block is neighboring all the first sphere of the second block, the fourth sphere of the fifth block and the third sphere of the third block, and having the third sphere of the fourth block contacting an upper part of the third sphere of the third block such that the third sphere of the fourth block is neighboring both the first and second spheres of the third block, and also having the second sphere of the fourth block contacting upper parts of both the first and second spheres of the third block such that the second sphere of the fourth block is located at the top of stacked arrangement;

Sequence (C): firstly, stacking the four spheres of the first block on the four concaves of one of the sides of the regular triangle on the top surface of the stand; secondly, stacking the second, third and fourth spheres of the second block on the concaves of another one of the sides of the regular triangle on the top surface of the stand, and having the first sphere of the second block contacting upper parts of both the third and fourth spheres of the first block; thirdly, stacking the second and third spheres of the fifth block on the concaves neighboring the fourth and third spheres of the second block, having the first sphere of the fifth block contacting upper parts of both the third and fourth spheres of the second block, and having the fourth sphere of the fifth block contacting upper parts of both the second and third spheres of the second block such that the fourth sphere of the fifth block is neighboring the first sphere of the second block; fourthly, stacking the fourth sphere of the third block on the concave locating between the first sphere of the first block and the second sphere of the fifth block, having the third sphere of the third block contacting upper parts of both the second and third spheres of the fifth block such that the third sphere of the third block is neighboring the first and fourth spheres of the fifth block, and having the second sphere of the third block contacting upper parts of both the first and fourth spheres of the fifth block, and also having the first sphere of the third block contacting upper parts of both the fourth sphere of the fifth block and the first sphere of the second block; and finally, stacking the fourth sphere of the fourth block right on a middle of upper parts of the fourth sphere of the third block and the first and second spheres of the first block such that the fourth sphere of the fourth block is neighboring the third sphere of the third block, having the first sphere of the fourth block stacking right on a middle of upper parts of the third sphere of the fifth block and the second and third spheres of the first block such that the first sphere of the fourth block is neighboring all the first sphere of the second block, the fourth sphere of the fifth block and the third sphere of the third block, and having the third sphere of the fourth block contacting an upper part of the third sphere of the third block such that the third sphere of the fourth block is neighboring both the first and second spheres of the third block, and also having the second sphere of the fourth block contacting upper parts of both the first and second spheres of the third block such that the second sphere of the fourth block is located at the top of stacked arrangement;

Sequence (D): firstly, stacking the four spheres of the first block on the four concaves of one of the sides of the regular triangle on the top surface of the stand; secondly, stacking the second, third and fourth spheres of the fourth block on the concaves of another one of the sides of the regular triangle on the top surface of the stand, and having the first sphere of the fourth block stacking on the concave neighboring the second and third spheres of the first block; thirdly, stacking the first sphere of the third block on the concave neighboring the first sphere of the fourth block as well as the third and fourth spheres of the first block, having the second sphere of the third block contacting upper parts of both the third and fourth spheres of the first block, and having the third sphere of the third block contacting upper parts of the first sphere of the fourth block as well as the second and third spheres of the first block, and also having the fourth sphere of the third block contacting upper parts of the second sphere of the fourth block as well as the first and second spheres of the first block; fourthly, stacking the first sphere of the fifth block right on a middle of upper parts of the first, second and third spheres of the fourth block such that the first sphere of the fifth block is neighboring the third and fourth spheres of the third block, having the second sphere of the fifth block contacting upper parts of both the third and fourth spheres of the third block, and having the third sphere of the fifth block contacting upper parts of both the second and third spheres of the third block, and also having the fourth sphere of the fifth block contacting upper parts of both the first sphere of the third block and the first sphere of the fourth block such that the fourth sphere of the fifth block is neighboring the second and third spheres of the third block; and finally, stacking the first sphere of the second block on the concave located between the first sphere of the third block and the fourth sphere of the fourth block, having the second sphere of the second block contacting upper parts of both the third and fourth spheres of the fourth block such that the second sphere of the second block is neighboring the first and fourth spheres of the fifth block, and having the third sphere of the second block contacting upper parts of both the first and fourth spheres of the fifth block such that the third sphere of the second block is neighboring the second and third spheres of the fifth block, and also having the fourth sphere of the second block contacting upper parts of both the second and third spheres of the fifth block such that the fourth sphere of the second block is located at the top of stacked arrangement.

* * * * *